United States Patent
Kim et al.

(10) Patent No.: US 8,860,716 B2
(45) Date of Patent: Oct. 14, 2014

(54) 3D IMAGE PROCESSING METHOD AND PORTABLE 3D DISPLAY APPARATUS IMPLEMENTING THE SAME

(75) Inventors: Jeong Jin Kim, Seoul (KR); Chul Park, Hanam-si (KR)

(73) Assignee: 3D NURI Co., Ltd., Daejeon (KR)

( * ) Notice: Subject to any disclaimer, the term of this patent is extended or adjusted under 35 U.S.C. 154(b) by 72 days.

(21) Appl. No.: 13/271,398

(22) Filed: Oct. 12, 2011

(65) Prior Publication Data
US 2012/0092335 A1    Apr. 19, 2012

(30) Foreign Application Priority Data

Oct. 13, 2010  (KR) ................. 10-2010-0099723
May 9, 2011    (KR) ................. 10-2011-0043507

(51) Int. Cl.
| | | |
|---|---|---|
| *G06T 15/00* | (2011.01) | |
| *H04N 13/00* | (2006.01) | |
| *H04N 21/81* | (2011.01) | |
| *H04N 21/414* | (2011.01) | |
| *H04N 13/04* | (2006.01) | |

(52) U.S. Cl.
CPC ........ *H04N 13/0037* (2013.01); *H04N 13/0456* (2013.01); *H04N 21/816* (2013.01); *H04N 13/0409* (2013.01); *H04N 13/0029* (2013.01); *H04N 21/414* (2013.01); *H04N 13/0452* (2013.01)
USPC ............................. 345/419; 345/603; 345/604

(58) Field of Classification Search
None
See application file for complete search history.

(56) References Cited

U.S. PATENT DOCUMENTS

| 2006/0013297 A1* | 1/2006 | Suzuki et al. ............ 375/240.01 |
| 2008/0165181 A1* | 7/2008 | Wang et al. ................... 345/419 |
| 2010/0123725 A1* | 5/2010 | Azar et al. ..................... 345/501 |
| 2010/0142924 A1* | 6/2010 | Yamashita et al. .............. 386/95 |

OTHER PUBLICATIONS

Wimmer "Stereoscopic Player and Stereoscopic Multiplexer: a computer-based system for stereoscopic video playback and recording." Stereoscopic Displays and Virtual Reality Systems XII 5664 (2005): 400-411.*

* cited by examiner

*Primary Examiner* — Tize Ma
*Assistant Examiner* — Yu Chen
(74) *Attorney, Agent, or Firm* — Jefferson IP Law, LLP

(57) ABSTRACT

A method and a 3D display apparatus for processing a stereoscopic image signal in high rate by software while using a least number of hardware components in a portable 3D display apparatus based on a mobile Android platform are provided. This method is suitable for a portable terminal apparatus equipped with a kernel layer directly controlling hardware means including a display panel, and an application/middleware layer controlling the kernel layer to display a motion picture through the hardware means. One or more plane image surfaces are first generated from the application/middleware layer and stored in a first frame buffer. An encoded image signal is decoded under the application/middleware layer to restore a YUV image signal representing a stereoscopic image pair. Subsequently, the YUV image signal is converted into an RGB image signal, and left and right images of the RGB image signal are mixed at the kernel layer.

12 Claims, 13 Drawing Sheets

3D IMAGE PROCESSING METHOD AND PORTABLE 3D DISPLAY APPARATUS IMPLEMENTING THE SAME

PRIORITY

This application claims the benefit under 35 U.S.C §119(a) to a Korean patent Application filed on Oct. 13, 2010 in the Korean Intellectual Property Office and assigned Serial No. 10-2010-0099723, and a Korean patent Application filed on May 9, 2011 in the Korean Intellectual Property Office and assigned Serial No. 10-2011-0043507, the entire disclosure of which is hereby incorporated by reference.

BACKGROUND OF THE INVENTION

1. Field of the Invention

The present invention relates to image processing methods and apparatuses. More particularly, the present invention relates to three-dimensional (3D) display apparatuses and methods.

2. Description of Related Art

Human visual system is capable of finding relative positions of things by using many types of depth clues. Those depth clues include physiological factors such as accommodation, convergence, binocular disparity, motion parallax, etc., and psychological factors such as linear distance, shading, shade distance, hiding by another object, texture grade, color, etc. In the physiological depth clues, accommodation is to vary a focus range of the crystalline lens for the purpose of focusing the eyes on a specific position. The function of accommodation is operating with convergence. Meantime, convergence is to make one's eyes meet at a target point by moving inward when he is gazing into the target point apart from him in a limited distance. Binocular disparity is oriented from the fact that the left and right eyes are arranged to respond respective images because they are spaced from each other in about 65 mm, which means a difference between images incident upon the left and right retinas while looking at a 3D scene. This function of binocular disparity acts as a critical depth clue which is used for depth sense or stereopsis in the human visual system.

A 3D display apparatus is designed to display a 3D image by utilizing such a cognition mechanism of the human visual system. Ever been proposed various types of 3D image display modes, a stereoscopic mode can be regarded as remarkable on the aspect of technical reducibility and 3D display capability at the time when this patent application is filed. In a stereoscopic 3D display system, it is possible to realize depth cognition or stereopsis through simulation with binocular disparity by rendering the left and rights eyes to receive two images that are independently taken by two image sensors spaced in about 64 mm as like human's eyes.

Here, it is necessary to exclude interference by controlling two images forming a couple of stereoscopic images, i.e., the left and right images, to exactly be sent to the left and right eyes of a user. There are several ways to control interference, such as a polarization type (also called passive glasses type or film patterned retarder (FPR) type) in which a phase modulation plate is equipped on a display panel to generate orthogonal polarization from left and right images and the left and right images are respectively incident on user's left and right eyes through polarized filters embedded in glasses of the user, an active glasses type (also called shutter glasses type) in which left and right images are alternately applied to a display panel and a user's active glasses operates to alternately open its left and right shutters, a lenticular type in which a lenticular lens is employed to control a light path, a parallax barrier type in which a parallax barrier electrically generated operates to partly screen and then left and right images are respectively incident on the left and right eyes of a user.

At the times of this application, while the most widely case of the stereoscopic 3D display system is generally known is involved in television sets, there are also many technical approaches to implement the stereoscopic 3D display into monitors of personal computers (PCs), smart phones, and data processing units such as tablet computers. Managing 3D image signals in a data processing unit is normally conducted by means of an application program such as a multimedia player. Comparative to a 2D image playback technique simply decoding an original image signal, changing its format and then playing back the decoded and formatted original image signal, playing back a 3D image could cause an operative burden to be increased as it is necessary to decode the 3D image signal and mix left and right images.

Data processing apparatuses such as desktop or laptop computers are easy to process 3D image signals by application programs because their own microprocessors have sufficient performance in operation. To the contrary, portable apparatuses, such as smart phones or tablet computers, employing embedded slow processors in consideration of power consumption and heat discharge, is insufficient for processing 3D image signals less than high-performance computers do. Therefore, it at present is inevitable for the portable apparatuses to result in low frame or bit rates, or low degree of resolution in playing back 3D images by application programs. Especially, like a system adopting an android platform, in case an application program is composed of binary codes to be processed by a virtual machine such as Dalvic not native codes such as C/C++, an execution rate of the application program deeply downs. Additionally, in playing back a 3D image only by means of an application program, it takes much boot time because the application program becomes larger in volume.

Considering those limitations, some types of portable apparatuses have been playing back 3D images by appending chipsets thereto for the 3D image signal processing in addition to embedded processors. For this function, an android platform is configured to embody hardware acceleration and image processing by external hardware by way of Hardware Abstraction Layer (HAL). However, such an additional chipset could cause the prime cost and price, as well as increasing an occupation area on a printed circuit board of the apparatus.

SUMMARY OF THE INVENTION

Aspects of the present invention are to address at least the above-mentioned problems and/or disadvantages and to provide at least the advantages described below. Accordingly, an aspect of the present invention is to provide a method for processing stereoscopic image signals in high rate, while reducing additional hardware components more than a processor in a portable 3D display apparatus based on mobile applicable platform.

Another aspect of the present invention is to provide a 3D display apparatus operable based on mobile applicable platform, portable, and capable of playing back stereoscopic images in high rate without any hardware component like a 3D specific chipset.

Another aspect of the present invention is to provide a method may be suitable for a portable terminal apparatus equipped with a kernel layer directly controlling hardware means including a display panel, and an application/middleware layer controlling the kernel layer to display a motion picture through the hardware means.

In an exemplary embodiment of this method for image signal processing, one or more plane image surfaces are first generated from the application/middleware layer and stored in a first frame buffer. An encoded image signal is decoded under the application/middleware layer to restore a YUV image signal representing a stereoscopic image pair. Subsequently, the YUV image signal is converted into an RGB image signal, and left and right images of the RGB image signal are mixed at the kernel layer. A mixed stereoscopic image signal is stored in a second frame buffer. Then, signals, which are stored in the first and second frame buffers, are composed in hardware by overlaying at the kernel layer and the composite signal is transferred to the display panel. Thus, a stereoscopic (3D) image is displayed on the display panel along with a normal plane image.

In storing the plane image surface in the frame buffer, after generating a plurality of plane image surfaces at the application/middleware layer, the plane image surfaces are composed at the application/middleware layer and the composite surface is stored in the first frame buffer.

In generating and storing the mixed stereoscopic image signal, the YUV image signal is converted into the RGB image signal and the RGB image signal is stored in a mix buffer. Then, the left and right images of the RGB image signal stored in the mix buffer mixed and the mixed stereoscopic image signal is stored in an RGB buffer. The mixed stereoscopic image signal is transferred to the second frame buffer from the RGB buffer. Here, converting the YUV image signal into the RGB image signal is conducted at the kernel layer.

In accordance with an aspect of the present invention, a portable 3D display apparatus, abstracting a compressed image signal from an original image signal by demultiplexing and decoding the compressed image signal for display is provided. The apparatus includes a display panel equipped with a parallax barrier at the front and configured to display a stereoscopic image, a display controller configured to drive the display panel, first and second frame buffers configured to respectively store at least parts of an image to appear at the display panel through the display controller, In accordance with an aspect of the present invention, a microprocessor configured to control the multiplexing and decoding and conduct a program is provided. The microprocessor includes a kernel layer configured to directly control the display panel, and an application/middleware layer configured to control the kernel layer to display a motion picture on the display panel.

The microprocessor may be configured to generate one or more plane image surfaces at the application/middleware layer and store the plane image surfaces in the first frame buffer, decode an encoded image signal under control of the application/middleware layer and restore a YUV image signal to represent a stereoscopic image pair, convert the YUV image signal into an RGB image signal, mix left and right images of the RGB image signal at the kernel layer, and store a mixed stereoscopic image signal in the second frame buffer, and compose signals of the first and second frame buffers in hardware by overlaying at the kernel layer and transfer the composite signal to the display panel.

This image processing scheme by the exemplary embodiments may be based on a program executable in a display apparatus such as smart phone or tablet computer.

In accordance with an aspect of the present invention, a recording medium comprising a display apparatus is provided. The display apparatus includes a display panel configured to display a stereoscopic image, a display controller configured to drive the display panel, first and second frame buffers configured to respectively store at least parts of an image to appear at the display panel through the display controller, and a microprocessor configured to operate under a layer comprising: a kernel layer configured to directly control the display panel, and an application/middleware layer configured to control the kernel layer to display a motion picture on the display panel.

The microprocessor may be configured to: generate one or more plane image surfaces at the application/middleware layer and store the plane image surfaces in the first frame buffer, decode an encoded image signal under control of the application/middleware layer and restore a YUV image signal to represent a stereoscopic image pair, convert the YUV image signal into an RGB image signal, mix left and right images of the RGB image signal at the kernel layer, and store a mixed stereoscopic image signal in the second frame buffer, and compose signals of the first and second frame buffers in hardware by overlaying at the kernel layer and transfer the composite signal to the display panel.

In another exemplary embodiment, a method of processing a 3D image signal, suitable for a portable terminal apparatus equipped with hardware means having a display panel, a kernel layer directly controlling the hardware means, an application/middleware layer controlling the kernel layer to display a motion picture through the hardware means, a 3D image being displayed on the display panel along with a plane image, may be comprised of: generating and storing one or more plane image surfaces in a plane image layer buffer, decoding an encoded image signal under the application/middleware layer and restoring a YUV image signal to represent a stereoscopic image pair, converting the YUV image signal into an RGB image signal at the kernel layer, mixing left and right images of the RGB image signal at the application/middleware layer, and storing a mixed stereoscopic image signal in a stereoscopic image layer buffer, and composing signals, which are stored in the plane and stereoscopic image layer buffers, at the application/middleware layer and transferring the composite signal to the display panel.

In storing the plane image surface in the plane image layer buffer, the plane image surfaces are generated and stored respectively in a plurality of plane image layer buffers. In composing images, the signals, which are stored in the plane and stereoscopic image layer buffers, all composed.

In accordance with an aspect of the present invention, a portable 3D display apparatus, abstracting a compressed image signal from an original image signal by demultiplexing and decoding the compressed image signal for display, is provided. The portable 3D display apparatus includes a display panel equipped with a parallax barrier at the front and configured to display a stereoscopic image, a display controller configured to drive the display panel, a frame buffer configured to store an image which is to be displayed on the display panel, and a microprocessor configured to configured to control the multiplexing and decoding and conduct a program comprising: a kernel layer configured to directly control the display panel, and an application/middleware layer configured to control the kernel layer to display a motion picture on the display panel.

The microprocessor may be configured to: generate and store one or more plane image surfaces in a plane image layer buffer, decode an encoded image signal under the application/middleware layer and restoring a YUV image signal to represent a stereoscopic image pair, converting the YUV image signal into an RGB image signal at the kernel layer, mixing left and right images of the RGB image signal at the application/middleware layer, and storing a mixed stereoscopic image signal in a stereoscopic image layer buffer, and composing signals, which are stored in the plane and stereoscopic image layer buffers, at the application/middleware layer and transferring the composite signal to the display panel through the frame buffer.

This image processing scheme by the exemplary embodiments may be based on a program executable in a display apparatus such as smart phone or tablet computer.

In accordance with an aspect of the present invention, a display apparatus is provided. The display apparatus includes a display panel configured to display a stereoscopic image, a display controller configured to drive the display panel, a frame buffer configured to store at least a part of an image to appear at the display panel through the display controller, and a microprocessor configured to operate under a layer comprising: a kernel layer configured to directly control the display panel, and an application/middleware layer configured to control the kernel layer to display a motion picture on the display panel. Here, the microprocessor may be configured to: generate and store one or more plane image surfaces in a plane image layer buffer, decode an encoded image signal under the application/middleware layer and restoring a YUV image signal to represent a stereoscopic image pair, converting the YUV image signal into an RGB image signal at the kernel layer, mixing left and right images of the RGB image signal at the application/middleware layer, and storing a mixed stereoscopic image signal in a stereoscopic image layer buffer, and composing signals, which are stored in the plane and stereoscopic image layer buffers, at the application/middleware layer and transferring the composite signal to the display panel through the frame buffer.

According to exemplary embodiments of the present invention, in playing back stereoscopic images within a portable apparatus such as a smart phone and a tablet computer, the stereoscopic image signals can be processed on the most merits of software, i.e., of middleware and kernel layer above all. Especially, playing back 3D images is accomplished by rendering a procedure of mixing the left and right images, which needs the longest time in operation, to be processed with a process blending or mixing plural images in an android platform. Thus, a portable apparatus, adopting an embedded processor slower than a desktop-based processor, can be favored for playing back 3D images in high rate without losing the rates relative to frame, bit or resolution.

It also lessens an increase on the volumes or sizes of operating system kernels, middleware or library files under the hierarchical software structure.

Even employing hardware components in addition to the embedded processor will not affect increasing a cost or price of the portable apparatus in itself.

Moreover, a user can be provided with higher efficiency and satisfaction of the portable apparatus, enjoying convenient 3D watching environments without dizziness, since he is able to adjust a screen size and a parallax between left and right images in accordance with a distance between his eyes and the display screen.

A further understanding of the nature and advantages of the present invention herein may be realized by reference to the remaining portions of the specification and the attached drawings.

Other aspects, advantages, and salient features of the invention will become apparent to those skilled in the art from the following detailed description, which, taken in conjunction with the annexed drawings, discloses exemplary embodiments of the invention.

BRIEF DESCRIPTION OF THE DRAWINGS

The above and other aspects, features, and advantages of certain exemplary embodiments of the present invention will be more apparent from the following description taken in conjunction with the accompanying drawings, in which.

Throughout the drawings, it should be noted that like reference numbers are used to depict the same or similar elements, features, and structures.

DETAILED DESCRIPTION OF EXEMPLARY EMBODIMENTS

The following description with reference to the accompanying drawings is provided to assist in a comprehensive understanding of exemplary embodiments of the invention as defined by the claims and their equivalents. It includes various specific details to assist in that understanding but these are to be regarded as merely exemplary. Accordingly, those of ordinary skill in the art will recognize that various changes and modifications of the embodiments described herein can be made without departing from the scope and spirit of the invention. In addition, descriptions of well-known functions and constructions may be omitted for clarity and conciseness.

The terms and words used in the following description and claims are not limited to the bibliographical meanings, but, are merely used by the inventor to enable a clear and consistent understanding of the invention. Accordingly, it should be apparent to those skilled in the art that the following description of exemplary embodiments of the present invention is provided for illustration purpose only and not for the purpose of limiting the invention as defined by the appended claims and their equivalents.

It is to be understood that the singular forms "a," "an" and "the" include the plural referents unless the context clearly dictates otherwise. Thus, for example, reference to "a component surface" includes reference to one or more of such surfaces.

In order to more specifically describe exemplary embodiments, various aspects will be hereinafter described in detail with reference to the attached drawings.

Figure 1:
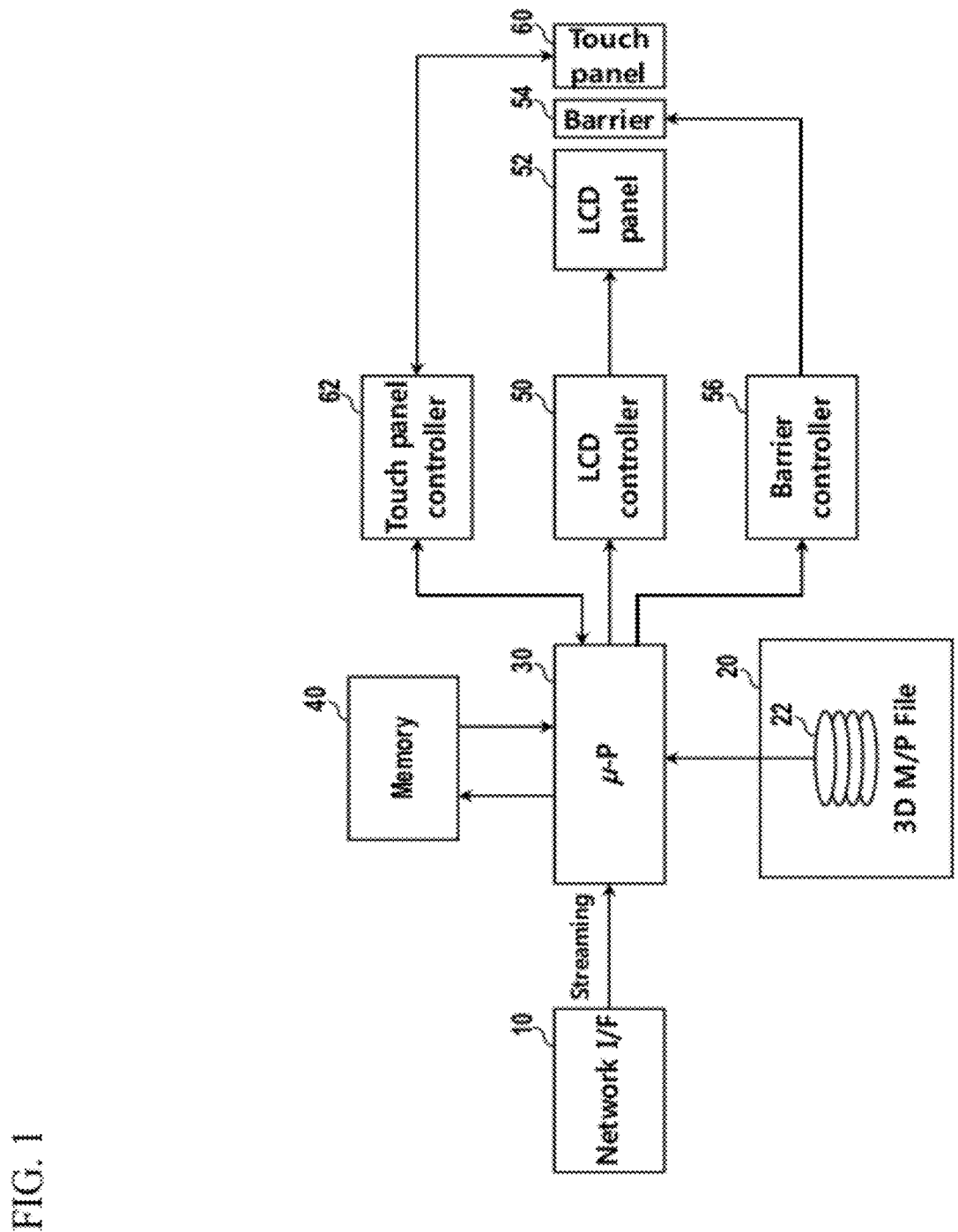
FIG. 1 is a block diagram illustrating a configuration of a 3D display apparatus according to an exemplary embodiment of the present invention.

FIG. 1 is a block diagram illustrating a configuration of a 3D display apparatus according to an exemplary embodiment of the present invention.

Referring to FIG. 1, a 3D display apparatus (hereinafter referred to as 'display apparatus') according to an exemplary embodiment of the present invention is configured by including network interface 10, nonvolatile memory 20, microprocessor 30, volatile memory 40, liquid crystal display (LCD) controller 50, LCD panel 52, parallax barrier 54, barrier controller 56, touch panel 60 and touch panel controller 62. In an exemplary embodiment, the display apparatus may be a portable multimedia playback device (e.g., portable music player; PMP). In another exemplary embodiment, the display apparatus may be a smart phone or tablet computer having a function of PMP, i.e., a function of playing back multimedia or motion pictures.

In FIG. 1, the network interface 10 is provided to couple up the display apparatus to an external access pointer through a wireless local area network (LAN) under the standard of 802.11 b/g/n, permitting the display apparatus to communicate with an external internet server. Especially, in this exemplary embodiment, the network interface 10 renders the display apparatus to receive a data stream of 3D motion picture from a streaming server.

The nonvolatile memory 20 is fixed in or removable from the display apparatus, storing 3D motion picture files.

The microprocessor 30 abstracts a compressed image signal, by demultiplexing, from a data stream supplied from a stream server or from a motion picture file stored in the nonvolatile memory 20, and then decodes the compressed image signal to restore a 3D image signal. The microprocessor 30 also operates to divide left and right image signals from the 3D image signal and mix the left and right image signals. In an exemplary embodiment, the 3D image playback process such as demultiplexing, decoding and mixing executed by the microprocessor 30 may be conducted through an android platform and an application program based on the android platform.

The volatile memory 40 functions as a physical buffer to data generated while the microprocessor 30 is operating.

In an exemplary embodiment, a motion picture stored in the nonvolatile memory 20 may be formed in MPEG4 structure and an image signal obtained from an MPEG4 container may be compressed in the format of H.264 (a standard for video compression). The image signal compressed under the H.264 standard is released through decoding and converted into a signal of YUV (Y: luminance, U: Cb, blue-difference chrominance component, V: Cr, red-difference chrominance component) format. Then the 3D image signal of YUV format is converted into an RGB format by a postprocessor of the microprocessor 30 and adjusted in size and orientation to be adaptable to the LCD panel 52. As a result, the microprocessor 30 obtains a side-by-side 3D image signal of RGB format, divides left and right images from the 3D image signal, and then mixes the left and right images.

The LCD controller 50 accepts the mixed image signal from the microprocessor 30 and makes the mixed image displayed on the LCD panel 52.

Figure 12:
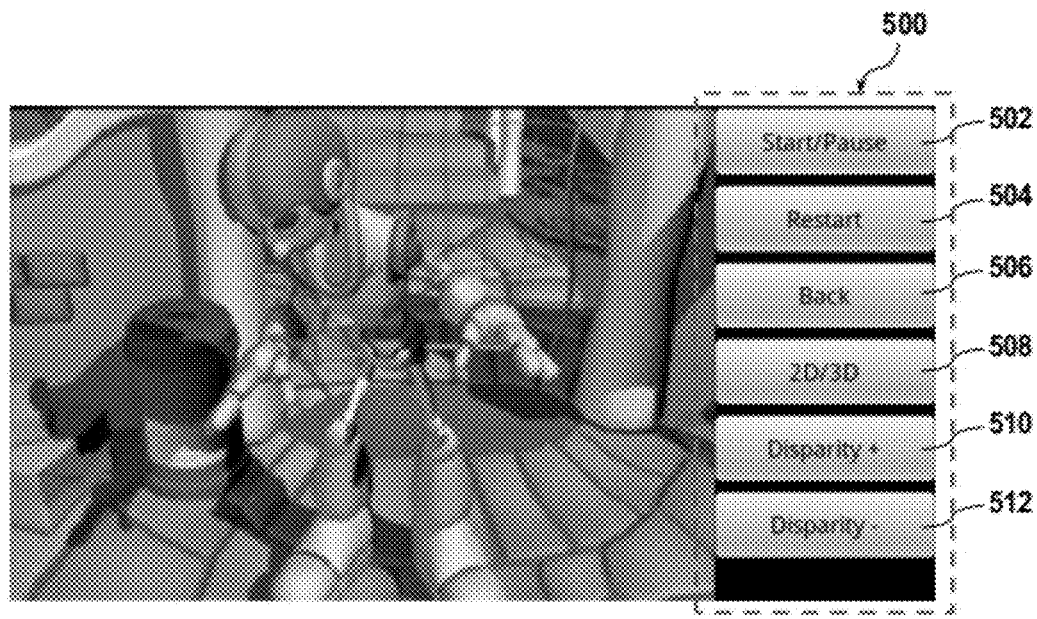
FIG. 12 shows a pattern of menu displayed on the screen when playing back a media file according to an exemplary embodiment of the present invention.

In an exemplary embodiment, the display apparatus uses a parallax barrier type to display left and right images in consideration for the actuality that it is inconvenient to use a polarized or shutter glasses in the environment of portable devices. As illustrated in FIG. 1, the parallax barrier 54 is set at the front of the LCD panel 52, partly screening the LCD panel 52 to make the left and right images transmitted respectively to the left and right eyes. The barrier controller 56 selectively activates the parallax barrier 54 whether an image displayed on the LCD panel 52 is 2D or 3D, and turns on the parallax barrier 54 when the displayed image is 3D. Selecting the 2D or 3D image is automatically executed by the microprocessor 30 with reference to a control signal (e.g., image attribute field of program specific information (PSI)) contained in an original image signal. In the meantime, as shown in FIG. 12, a user is able to select one of playback modes, 2D or 3D, at the format selection menu bars marked on the screen while an image is playing.

The touch panel 60 functions as an input terminal of the display apparatus. The touch panel controller 62 generates and applies a digital coordinate signal, which is converted from a signal sensed from the touch panel 60, to the microprocessor 30.

Figure 2:
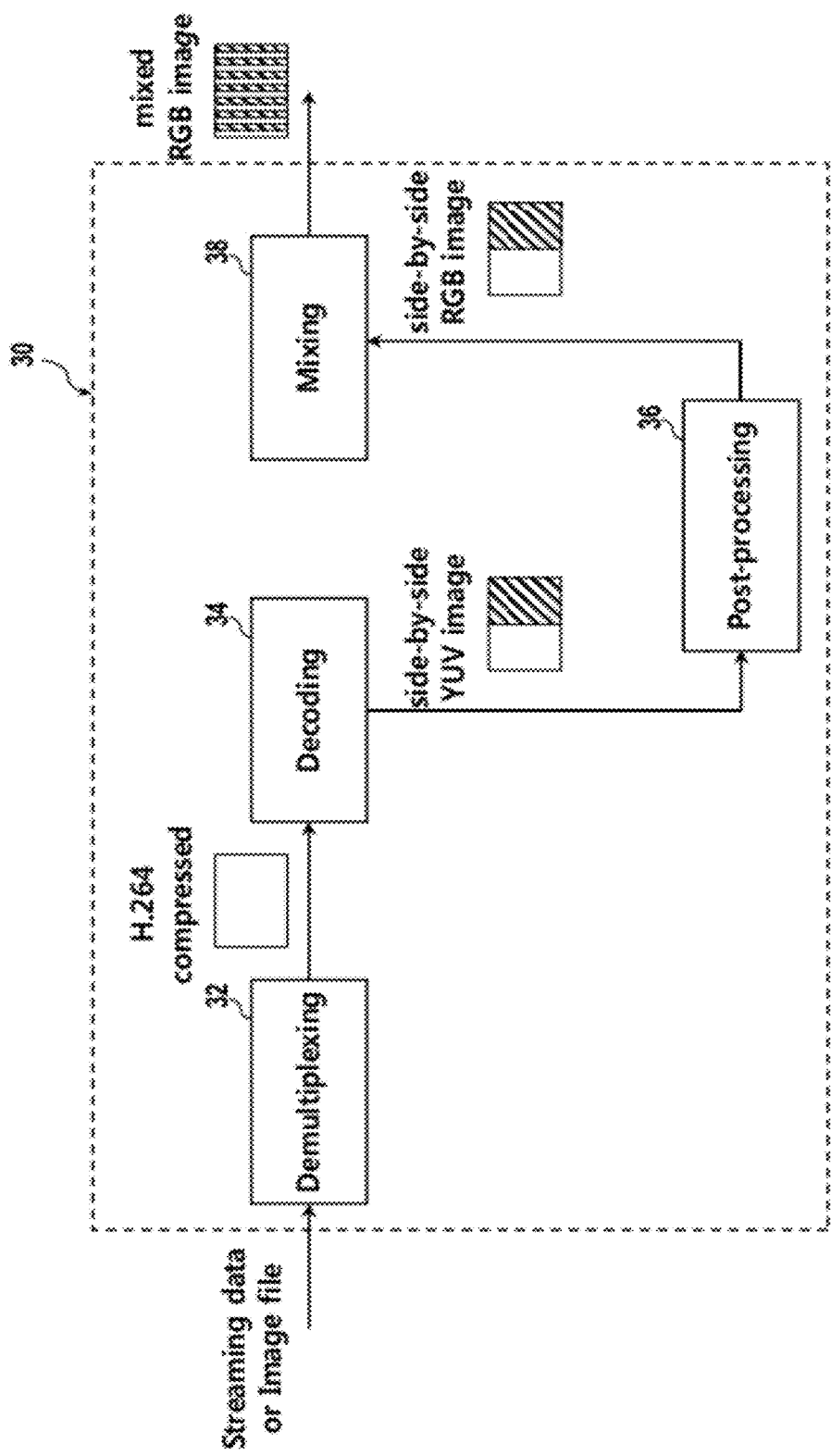
FIG. 2 is a block diagram illustrating a functional structure of a 3D image playback program prosecuted by the microprocessor shown in FIG. 1 according to an exemplary embodiment of the present invention.

FIG. 2 illustrates a functional structure of a 3D image playback program prosecuted by the microprocessor 30 according to an exemplary embodiment of the present invention. This program is functionally comprised of demultiplexing sector 32, decoding sector 34, post-processing sector 36 and mixing sector 38.

Referring to FIG. 2, the demultiplexing sector 32 operates to demultiplex a data stream which is received from a streaming server, or a motion picture file which is stored in the nonvolatile memory 20, and then abstracts an image signal which is compressed from a motion picture container (e.g., MPEG4 container). In an exemplary embodiment, an image signal abstracted from an MPEG4 container may be compressed in the format of H.264. In an exemplary embodiment, the demultiplexing sector 32 may be composed in a multimedia framework (e.g., OpenCORE; developed by PacketVideo Co.).

The decoding sector 34 operates to decode the compressed image signal to restore the original 3D image signal. In an exemplary embodiment, this 3D image signal is arranged in the side-by-side pattern with left and right images and represented in the YUV format with luminance and chrominance. In an exemplary embodiment, the decoding sector 34 may be formed of an H.264 decoder included in the multimedia framework (e.g., OneCORE). The H.264 decoder is managed by the multimedia framework.

The post-processing sector 36 accepts the 3D image signal of YUV format, converts its color space into the RGB format, and adjusts its size and orientation to be adaptable to the LCD panel 52. While this exemplary embodiment is proposed with the post-processing sector 36 made of software, it may be permissible for the post-processing sector 36 to be formed of a hardware chipset for 2D image processing.

Figure 3:
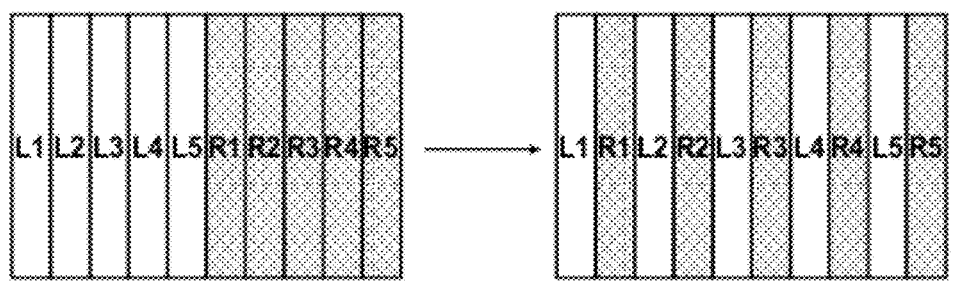
FIG. 3 shows a pattern of mixing left and right images according to an exemplary embodiment of the present invention.

The mixing sector 38 accepts the 3D image signal of RGB format from the post-processing sector 36 and then, as shown in FIG. 3, arranges the 3D image signals to be adaptable to the architecture of the parallax barrier 54 by alternately disposing its left and right images in the unit of vertical line.

In this exemplary embodiment, the program forming or controlling the demultiplexing sector 32, the decoding sector 34 and the mixing sector 38 illustrated in FIG. 2 is dispersedly composed of plural native stage services (i.e., libraries of android platform) and plural class objects resident at a kernel stage, not of a single program file, interfacing with class objects on Java stage services (i.e., application program level) through the Java native interface (JNI).

Figure 4:
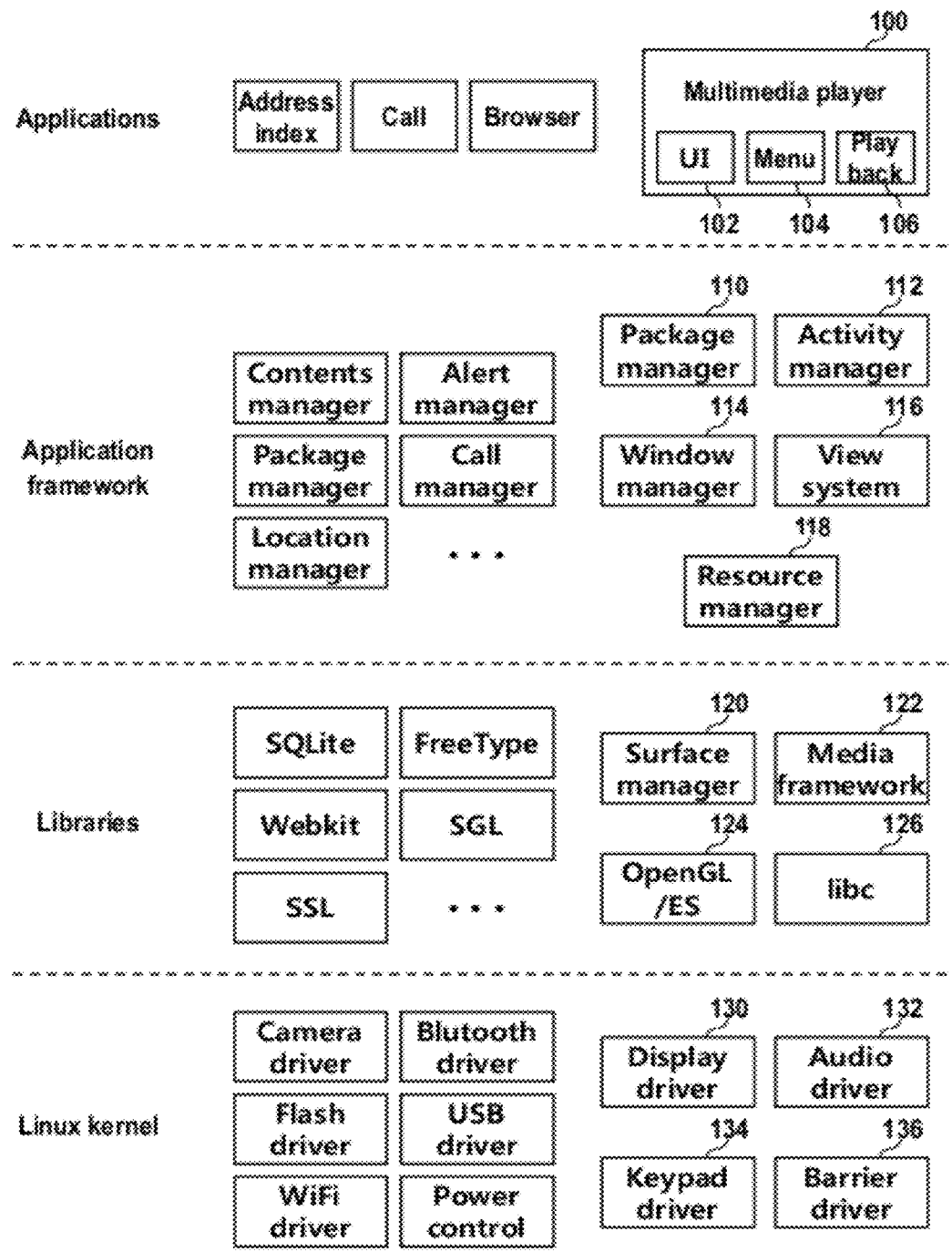
FIG. 4 shows hierarchical layers formation for android platforms and application programs executed in the display apparatus of FIG. 1 according to an exemplary embodiment of the present invention.

FIG. 4 shows hierarchical layers formation for android platforms and application programs executed in the display apparatus of FIG. 1 according to an exemplary embodiment of the present invention.

Hereinafter, it should be noted that libraries and application program frameworks, as well as application programs, involved in processing 3D image signals in the descriptions referring to FIG. 4 and other drawings or other subsequent description are prepared from modifying libraries, application program frameworks and application programs by the present invention. Since the first publication of 'Android' (July 2007) by Open Handset Alliance (OHA), Google set and has been holding the standards for Linux kernel, general library set and user interface in connection with android platform. This android platform is intended to be an entirely open platform and its source codes are fully released to permit anyone to fabricate software and devices therefrom. Especially, with respect to image playback at such an android platform, Google is proposing a prototype about class objects and a service framework similar to the following explanation. However those service framework and prototype are just for two-dimensional image blending and mixture. Because of the applicative limit of the conventional service framework and prototype of class objects, the present invention is driven to provide a solution of mixing left and right images for 3D images by modifying and improving such two-dimensional image blending and mixing techniques.

Referring to FIG. 4, the android platform includes a plurality of layers of applications, application framework, libraries and Linux kernel.

In an exemplary embodiment, the applications layer contains multimedia player 100 supporting 3D image playback. The multimedia player 100 is comprised of user interface (UI) function 102, menu indicating function 104 and playback control function 106. The UI function 102 sets an overall composition of the initial and playing screens and changes it by a user's request. In particular, according to an exemplary embodiment, the UI function 102 makes it enable for a user to select whether to display an image in the 2D or 3D form, adjust a disparity between left and right images, and activate the playback control function 106. The multimedia player 100 may be programmed with Java byte codes. In the applications layer, additional application programs for managing address index, call and web browsing may be prepared in the display apparatus of FIG. 1.

The application framework layer regulates an application programming interface (API) available for the application program layer where the multimedia player 100 is operating. Especially, package manager 110 administers installation of the application programs like the multimedia player 100. Activity manager 112 checks up life cycles of the application programs. Window manager 114 controls an overall pattern of screen, i.e., window, to be displayed on the LCD panel 52. Resource manager 118 holds a resource of original data to be played back. In addition, the application framework layer may further include a contents manager for data share between application programs, an alert manager for an alert from the other, a call manager for call operation, and a location manager for location information.

The libraries layer is formed by filing common functions from a lot of application programs. Each application program can be executed by calling out its corresponding library file through the application program framework layer. Especially, surface manager 120 is a library for mixing a plurality of pictures. Media framework 122 is a library for playing and recording image files. OpenGL/ES 124 is a type of 3D graphic engine developed by AMD. Standard C-library (libc) 126 is a typical C-language library. Additionally, the libraries layer may include SQLite as a relational database management system, FreeType for rendering bitmaps and vector fonts, HTML for expressing browsers, Webkit as a rendering engine, scalable graphic library (SGL) as a 2D graphic engine, secure socket layer (SSL) and so on. All libraries of the libraries layer may be composed of C or C++ language.

The Linux kernel is the center of the android platform, controlling hardware components of the display apparatus. Particularly, display driver 130, audio driver 132, keypad driver 134 and barrier driver 136 control the LCD panel 52, a speaker (not shown), the touch panel 60 and the parallax barrier 54, respectively, in operation. Additionally, in the Linux kernel may be included a power control program and kernel programs for peripheral devices such as camera, bluetooth, flash memory, USB interface, WiFi interface and so on.

Although not shown in FIG. 4, the android platform may be further comprised of a core library based on Java language, and a Davic virtual machine for executing Java byte codes.

In the hierarchical layers formation of FIG. 4, the application programs and the Java layers of the application framework can be connected with C/C++ libraries by way of a medium that is JNI. In detail, android application programs operating on the Dalvic virtual machine are slower in process than programs composed of native codes such as C/C++ language, whereas it is possible to enhance its processing rate by utilizing the C/C++ native code library to the utmost by way of JNI. For the display apparatus according to the present invention, the multimedia player 100 is modified to have 3D image playback facility by adding a 3D image processing function to the C/C++ native code library that has been prepared for 2D image processing, being controlled in operation by way of JNI.

Figure 5:
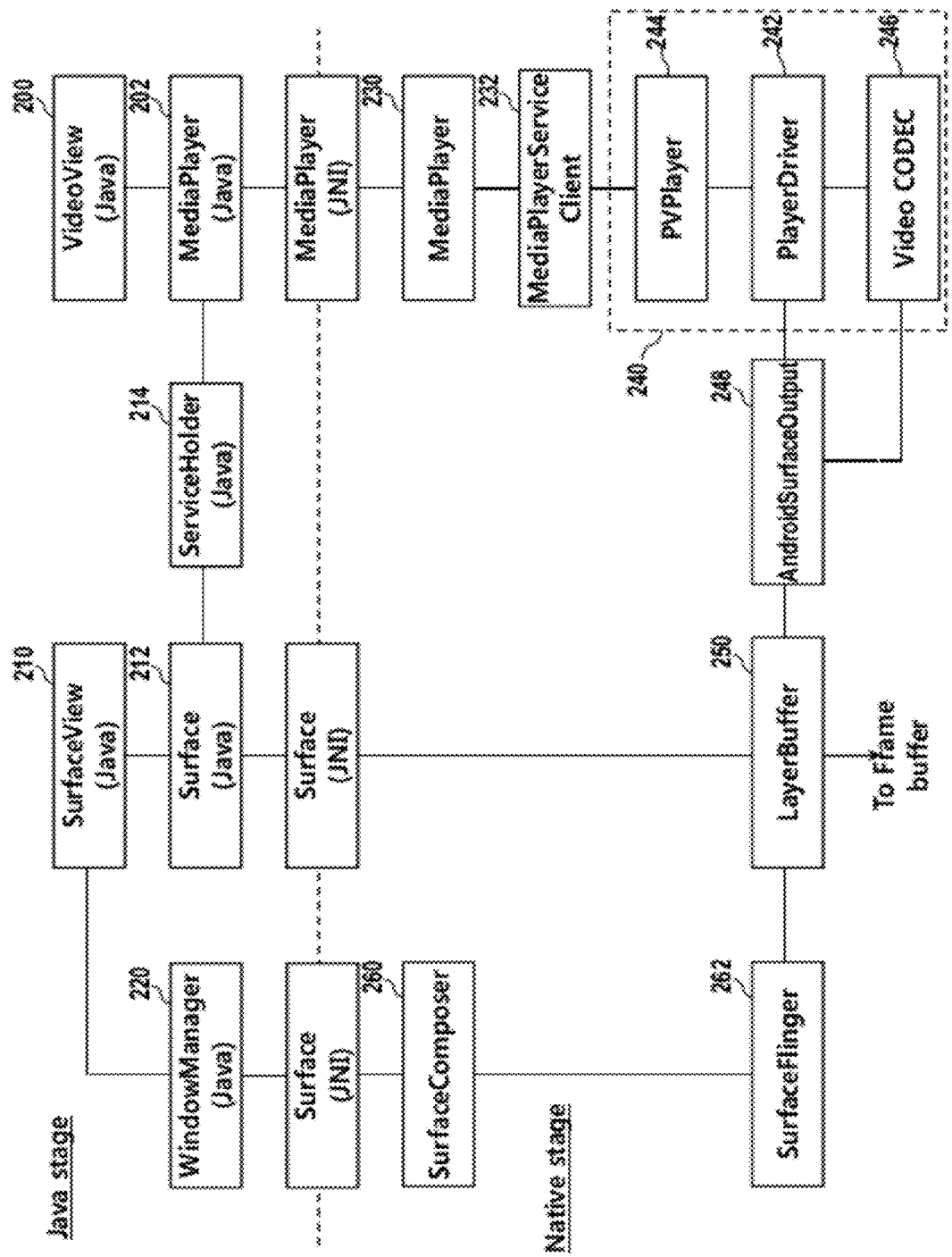
FIG. 5 is a block diagram exemplarily illustrating classes of Java and native stages for 3D display under the hierarchical layers formation shown in FIG. 4 according to an exemplary embodiment of the present invention.

FIG. 5 illustrates classes of Java and native stages for 3D display under the hierarchical layers formation shown in FIG. 4 according to an exemplary embodiment of the present invention. As a matter of convenience, a function included in each class of the Java stage will be referred to as 'method' and a library program out of classes will be referred to as 'function'.

Prior to explanation about the classes shown in FIG. 5, several terms will be defined as follows.

Under the standard of android platform, 'View' is a unit of user interface (UI), as a quadrangular area for processing painting, key strokes, or other correlative events. The View class acts to represent and occupy this View area.

Each activity can have one or more 'Window'. The Window can have one or more 'Surface'. Here, 'Window' represents pattern (i.e., look-and-feel), position and menu of window elements to be displayed on the screen. The Window class is a type of nonobjective class defining pattern and background of the highest level window. Thus, an instance belonging to the Window class is used as the highest View.

'Surface' means a buffer prepared for painting on the screen and managed by a screen composer. A surface is generated from SurfaceView class and defined in attribute by Surface class.

Therefore, a plurality of surfaces can be generated and maintained while an application program is operating, a part of the surfaces being combined as Window by the SurfaceView class. During this, all Windows are formed with surface objects located at the lower step of the screen. According as surfaces relevant to the highest Window are transferred to a frame buffer under control of WindowManager class, the highest Window can be displayed on the View area. With such a View or View groups, there are formed UI and output images.

Referring to FIG. 5, VideoView class instance 200 (hereinafter, 'class instance' will be referred to as 'class' in convenience), which is included in the multimedia player 100 that is an application program, is composed of Java byte codes, rendering a user to search a media file from a streaming server or the nonvolatile memory 20, count a file size, and select a display option. The VideoView class 200 also helps the functions of user input detection, playback start, still, replay, end point finding and so on. The VideoView class 200 requests surface allocation to SurfaceView class 210 when the multimedia player 100 starts.

MediaPlayer class 202 is composed of Java byte codes, controlling playback of audio/video files and streams. Once the VideoView class 200 selects playback control function, parameters relevant thereto are transferred to the MediaPlayer class 202 and then the MediaPlayer class 202 begins controlling the operation of playing back files and streams in response to a selection from a user.

The SurfaceView class 210 is composed of Java byte codes, rendering a surface for painting to be generated with embedment at the exact position on the screen and making the generated surface to be adjusted in format and size. One application program is allocated to one or more surfaces. In particular, according to this exemplary embodiment, the surface may be generated in response to a request of the VideoView instance 200. This surface allocation can be even carried out with WindowManager class 220.

The surface is disposed along a virtual axis vertical to the Z-axis, i.e., the panel plane, at the backside of the Window occupying SurfaceView. The SurfaceView class 210 makes surfaces to be properly displayed through a hold in the Window. During this, mixing surfaces is correctly managed in accordance with the hierarchical View architecture. In the meantime, the surface is generated when Window involved in SurfaceVeiw is visible.

The SurfaceView class 210 is cooperatively functioning with LayerBuffer class 250 which manages the post-processing sector 36. The SurfaceView class 210 also functions to control SurfaceFlinger class 262 through the WindowManager class 220.

Surface class 212 defines display styles such as blurring, dimming, rotating, hiding, freezing and so on for a surface generated by the SurfaceView class 210.

SurfaceHolder interface 214 is a nonobjective interface to surface itself, i.e., a buffer occupying the surface. The SurfaceHolder interface 214 renders a user to adjust a size and format of surface, edit pixels of surface, or monitor a changed matter of surface.

The WindowManager class 220 is a type of API assigned to Java application framework. Especially, in this exemplary embodiment, the WindowManager class 220 is provided to manage transfer of surfaces to the frame buffer by controlling the SurfaceFlinger class 262 by way of SurfaceComposer class 260 of the native stage in order to mix left and right images constituting a stereoscopic image pair.

MediaPlayer class 230 makes MediaPlayerServiceClient class 232 select an appropriate media subsystem or player in accordance with parameters accepted from the MediaPlayer class 202, and controls media playback by way of the MediaPlayerServiceClient class 232. The MediaPlayer class 230 also informs the MediaPlayer class 202 of a playback status.

The MediaPlayerServiceClient class 232 helps selecting the media subsystem 240 in accordance with parameters transferred through the MediaPlayer class 230, searching a media file from the streaming server or the nonvolatile memory 20, and rendering the media subsystem 240 to demultiplex and decode the media file which is to be played. The display apparatus according to the exemplary embodiments is also available with 2D images or audio files in media style, not with 3D images only, and adaptable to various formats of media signals. For this generic utility, the MediaPlayerServiceClient class 232 enables the media subsystem 240 proper to a media file to be played, or a subsystem previously selected by a user.

While FIG. 5 simply shows one of the media subsystem 240, it should be understand that pluralities of subsystems may be prepared on selection by the MediaPlayerService class 232. From this exemplary embodiment, the media subsystem 240 is established on the basis of the OpenCORE framework of PacketVideo Co., including playerDriver class 242, PVPlayer class 244, video CODEC 246 and an audio CODEC (not shown).

The PlayerDriver class 242 operates to generate a thread for the PVPlayer class 244 and makes the PVPlayer class 244 demultiplex media data and abstract a compressed image signal from the container (e.g., MPEG4 container). The video CODEC 246 decodes the compressed image signal to restore the original image. The restored image signal may be a 3D image signal of side-by-side style set in the YUV format.

AndroidSurfacOutput class 248 transfers a YUV image signal from the video CODEC 246 to LayerBuffer class 250.

The LayerBuffer class 250 receives a bit stream of the YUV image signal and manages data of YUV image signals to be used for the next process of RGB color space conversion and left/right image composition. SurfaceFlinger class 262 manages the frame buffer, which displays an image signal on the LCD panel 52, under control of SurfaceComposer class 260. The SurfaceComposer class 260 functions to merge layered surfaces by rendering the surfaces, which are assigned to individual application programs, to the frame buffer.

Figure 6:
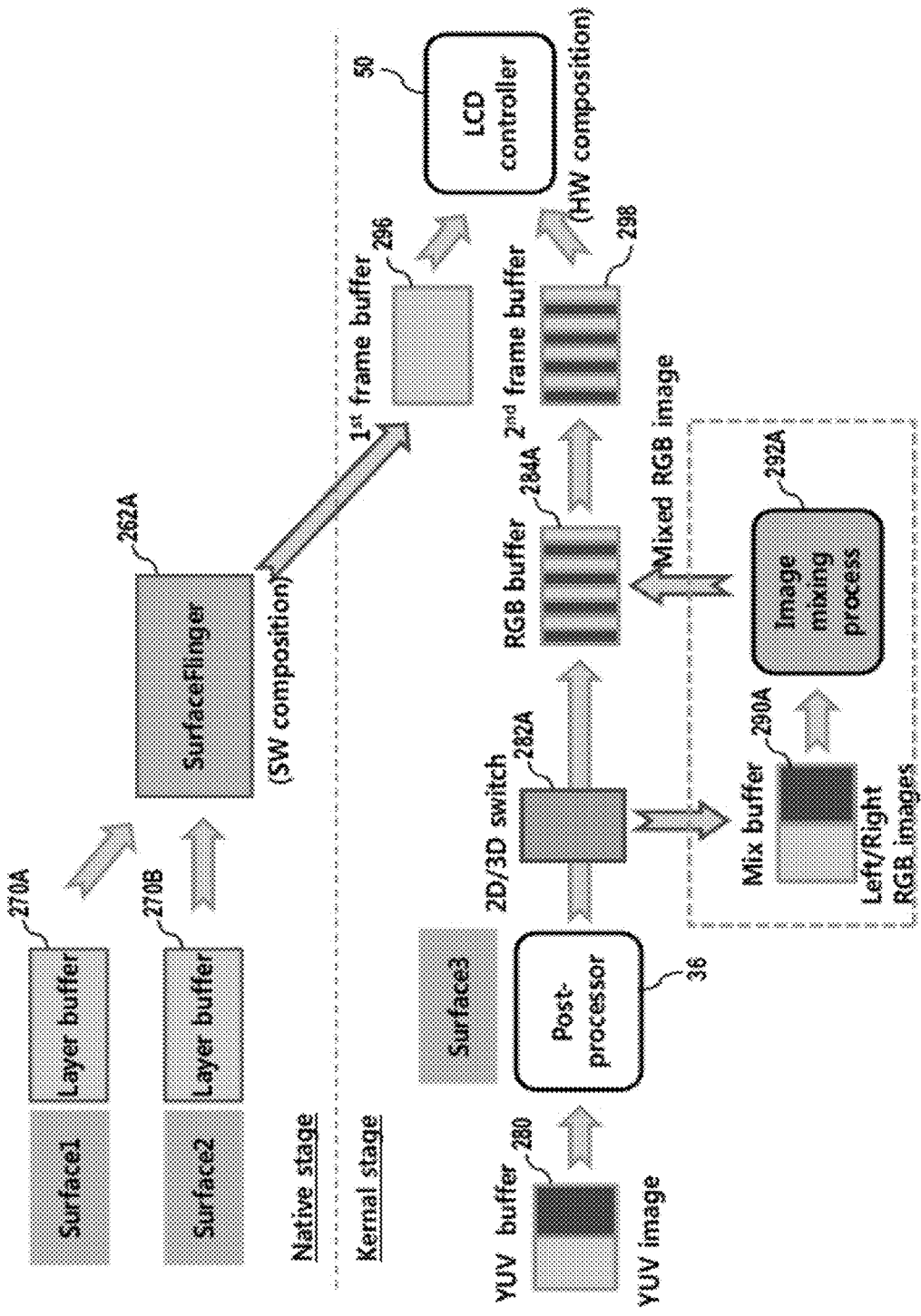
FIG. 6 illustrates an output terminal configured for color space conversion and mixing process with left and right images in the display apparatus shown in FIG. 1 according to an exemplary embodiment of the present invention.

FIG. 6 illustrates an output terminal configured for color space conversion and mixing process with left and right images in the display apparatus shown in FIG. 1 according to an exemplary embodiment of the present invention. The process of the output terminal composes a 3D image by mixing left and right images that form a stereoscopic image pair, and outputs a composite image of plural plane images along with the 3D image. Here, the plural plane images are composed in software though SurfaceFlinger class 262A. The composite plane and 3D images are composed in hardware in the LCD controller 50 through an overlay function of frame buffers 296 and 298.

First and second layer buffers 270A and 270B, as surface buffers used by the SurfaceFlinger class 262A, are each storing normal plane images (i.e., still images) generated through a variety of activities that are types of Java applications. This plane image has a general rendering characteristic, which for example may be information about title and menu attendantly displayed on the screen while 3D image contents are playing back.

The SurfaceFlinger class 262A functions to compose memory data of layered structure like surface data stored in the first and second layer buffers 270A and 270B by rendering plural surfaces to the first frame buffer 296 in one.

Since a normal plane image is few variable in the screen, even composing it by the SurfaceFlinger class 262A in software mode rarely affect the system. However, a mobile management system would be caused to meet with a larger amount of load if such a normal plane image is composed with surfaces, which is set to perform motion picture display or camera (not shown in FIG. 1) preview, by the Surface-Flinger class 262A. For that reason, this exemplary embodiment is reduced such that the SurfaceFlinger class 262A composes normal plane image surfaces only, but not mixed 3D image surfaces.

According to this exemplary embodiment, the second frame buffer 298 is arranged exclusively for processing 3D motion picture display and camera preview. The LCD controller 50 merges the first and second frame buffers 296 and 298 in hardware by way of overlay function and transfers outputs of the buffers into the LCD panel 52, making therefore it enable to process image signals in a very high rate. API controlling this function is called Video 4 Linux 2 (V4L2). This V4L2 API is transferred to the AdroidSurfaceOutput class 248 by way of the LayerBuffer class 250, being conditioned under control of its correspondent class.

In Kernal stage, there is additionally provided YUV buffer 280, the postprocessor 36, 2D/3D switch 282A, RGB buffer 284A, mix buffer 290A, conducting image mixing process 292A The YUV buffer 280 receives a YUV image signal trough the LayerBuffer class 250. The postprocessor 36 converts the YUV image signal to an RGB image signal under control of the ServiceFlinger class 262A or the LayerBuffer service 250.

The 2D/3D switch 282A transfers an RGB image signal from the postprocessor 36 directly to the RGB buffer 284A if an image signal is a 2D image signal. But if an image signal is a 3D image signal, the 2D/3D switch 282A transfers an RGB signal from the postprocessor 36 to the mix buffer 290A so as to mix left and right images, which is contained in the RGB image signal, by means of the image mixing process 292A.

In an exemplary embodiment, determining whether an image signal is 2D or 3D is accomplished with reference to a control signal (e.g., program specification information; PSI) included in an original image signal. This determination may be carried out at the application layer and then a determined result may be transferred to the 2D/3D switch 282A, or result directly from the 2D/3D switch 282A. On the other hand, the 2D/3D switch 282A may be changeable in switching operation according as that a user selects a playback type, 2D or 3D, from a pocket selection menu marked on the screen while an image is playing back. Otherwise, a terminal apparatus may be equipped with a mechanical switch to select 2D or 3D.

The image mixing process 292A operates to mix left and right images, which are contained in an RGB image stored in the mix buffer 290A, on a lengthwise line. In this exemplary embodiment, the image mixing process 292A is executed at the kernel stage. In other words, mixing left and right images by this exemplary embodiment is directly processed at the kernel stage, not at a middleware stage in the android framework.

In detail about the procedure of 3D mixing with left and right images, the image mixing process 292A does not transfer bit streams in sequence, but copy by alternately abstracting pixels from the parts of left and right images in the 3D RGB image of side-by-side format, in sending the bit streams of image signals to the RGB buffer 284A from the mix buffer 290A. That is, the image mixing process 292A abstracts a first left image pixel in the unit of scan line from an RGB image shown at the left side of FIG. 3 and transfers the first left image pixel to a first pixel position of the RGB buffer 284A, and then abstracts a first right image pixel in the unit of scan line from the RGB image and disposes the first right image pixel at a second pixel position of the RGB buffer 284A. Subsequently, the image mixing process 292A abstracts a second left image pixel from the RGB image of the mix buffer 290A and transfers the second left image pixel to a third pixel position of the RGB buffer 284A, and then abstracts a second right image pixel from the RGB image and disposes the second right image pixel at a fourth pixel position of the RGB buffer 284A. By conducting this sequence over the RGB image, the RGB buffer 284A takes and stores a mixed image where left and right images are alternately arranged in the unit of vertical line.

In the output terminal shown in FIG. 6, considering the flow of plane image surfaces for general Java applications processed by the SurfaceFlinger class 262A, the surfaces respective to Java applications are merged by the Surface-Flinger class 262A which performs software composition and then transferred to the first frame buffer 296.

To the contrary, since other surfaces, which are processed during application for motion picture playback or camera preview, may be degraded in performance when they are composed in software by means of the SurfaceFlinger class 262A, they are transferred directly to the second frame buffer 298, which is exclusively assigned thereto, without passing through the SurfaceFlinger class 262A. Then, the first and second frame buffers 296 and 298 are merged by the LCD controller 50 in hardware.

With respect to a process with motion picture surfaces, a YUV image stored in the YUV buffer 280 is converted into an RGB image by the postprocessor 36 and scaled to fit for a screen size. If the 2D/3D switch 282A is set in the 2D mode, a normal 2D image is transferred to the second frame buffer 298 after first storing in the RGB buffer 284A. On the other side, if the 2D/3D switch 282A is set in the 3D mode, an RGB image output from the postprocessor 36 is copied into the mix buffer 290A. Then, left and right images contained in the RGB image stored in the mix buffer 290A are mixed by the image mixing process 292A and stored in the RGB buffer 294A as a mixed RGB bit stream.

Afterward, the mixed RGB bit stream stored in the RGB buffer 294A is transferred to the second frame buffer 298 that is exclusive for motion picture. Data stored in the first and second frame buffers 296 and 298 are composed in hardware by overlaying through the LCD controller 50. When the composite 3D image is displayed on the LCD panel 52, a user facing the parallax barrier 54 is able to watch a stereoscopic 3D image together with a title and/or menu.

According to this exemplary embodiment, the flow of surfaces relevant to the 3D motion picture mixing has an effect of entirely shortening a processing time because it proceeds directly through the kernel stage, not through a middleware stage, such that the surfaces are not copied in the native stage, and the surfaces are not composed in software by the Surface-Flinger class 262A.

Figure 7A:
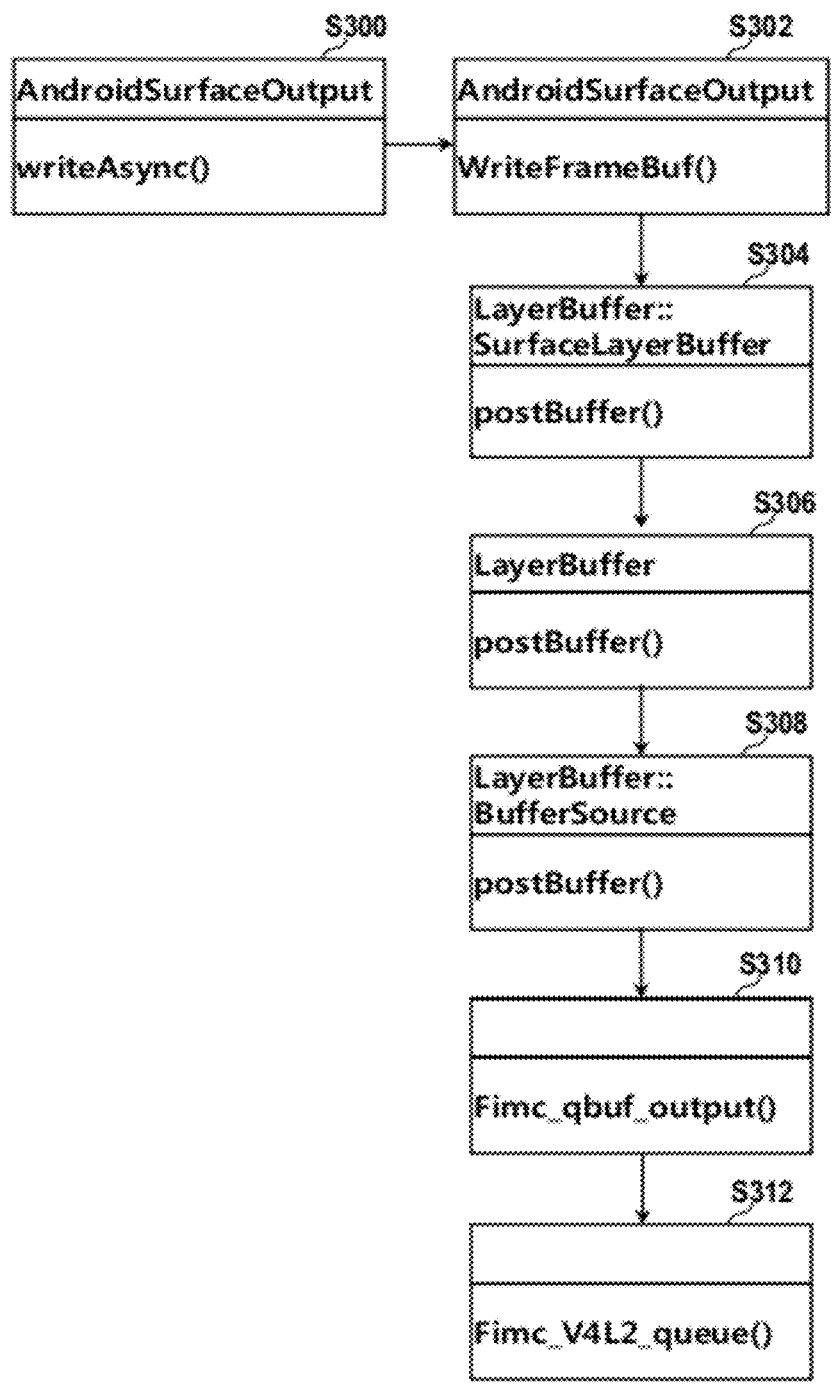
FIGS. 7A and 7B are flowcharts showing execution sequences of functions conducting the 3D image processing in the configuration shown in FIG. 6 according to an exemplary embodiment of the present invention.
Figure 7B:
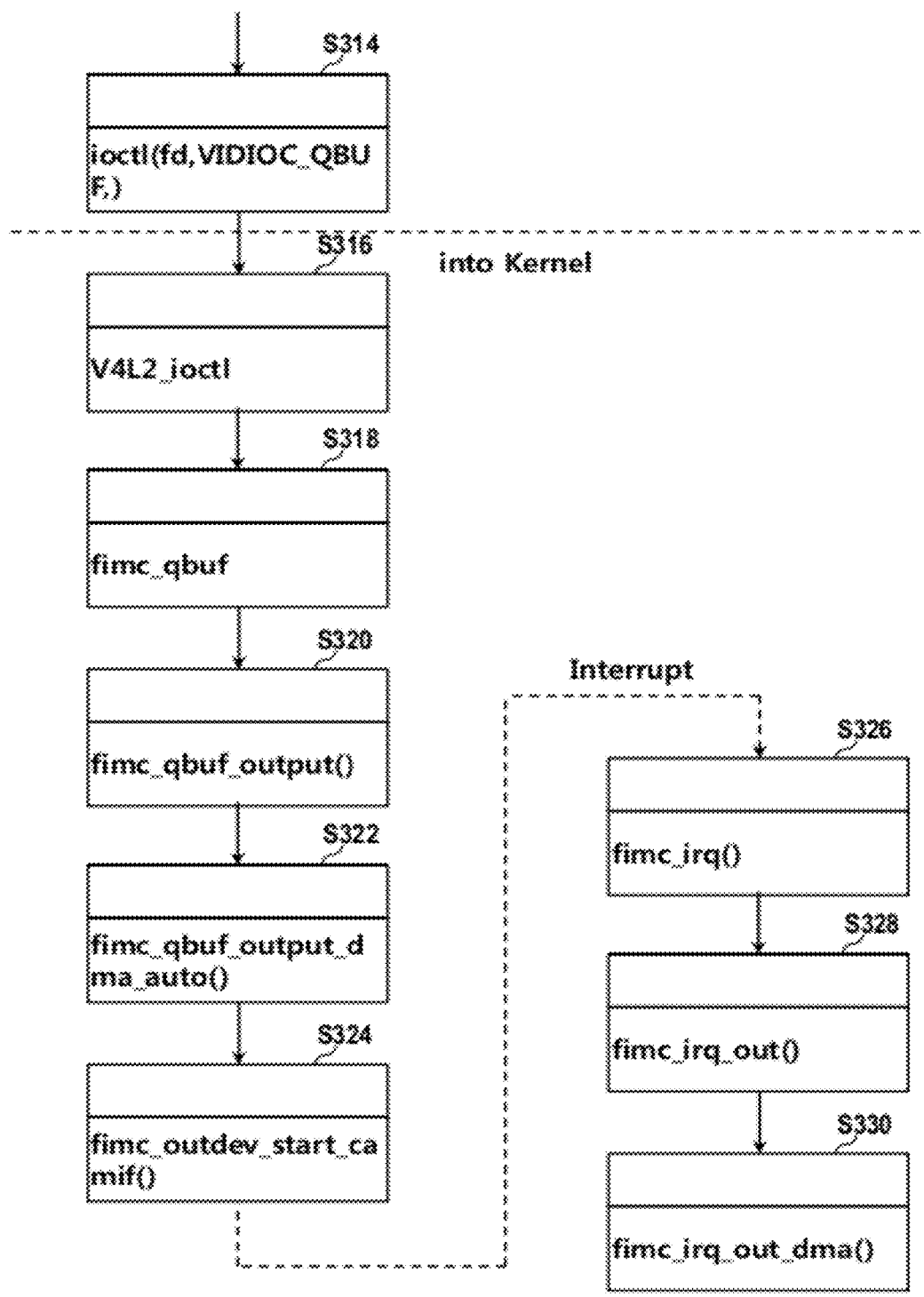

FIGS. 7A and 7B are flowcharts showing execution sequences of functions conducting the 3D image processing in the configuration shown in FIG. 6 according to an exemplary embodiment of the present invention.

If a YUV image signal decoded from the video CODEC 246 appears in response to a timer's synchronization, member function writeAsync( ) is executed every predetermined time for synchronization with audio in AndroidSurfaceOutput class 250 (S300). The member function writeAsync( ) invokes function WriteFrameBuffer( ) to copy an image signal into a buffer of the postprocessor for the purpose of conversion from a decoded YUV signal to an RGB signal (S302). The function WriteFrameBuffer( ) transfers a decoded media bit stream to SurfaceLayerBuffer class that is a subclass of the LayerBuffer class 250.

The decoded YUV bit stream is transferred to the LayerBuffer class 250 by function postBuffer( ) of the SurfaceLayerBuffer class (S304) and then transferred to BufferSource class, which is another class of the LayerBuffer class 250, by the function postBuffer( ) (S306).

The function postBuffer( ) of the BufferSource class enables the postprocessor 36 to convert a YUV image signal into an RGB image signal while the YUV bit stream is storing in the YUV buffer 280 (S308). For this conversion, the function postBuffer( ) invokes V4L2 API.

From step S310 until step S324, functions for converting the YUV image signal to the RGB image signal are invoked and finally a control signal is granted to the postprocessor 36 for conversion from the YUV image signal into the RGB image signal, resulting in color space conversion to the RGB format.

First, in step S310, a physical address of data to transfer the YUV bit stream is set by function Fimc_set_DMA_address( ) of the BufferSource class.

In step S312, after function Fimc_V4L2_queue( ) defines a size of a buffer to be used for converting the YUV image signal into the RGB image signal, function ioctl( ) is invoked to execute device drivers of the kernel stage (S314).

The programming flow from step S316 is a kernel process for the device drivers at the kernel stage executed by a V4L2 interface driver of the kernel stage. In step S316, the V4L2 interface driver of the kernel stage begins driving to identify a source of the YUV image signal and a status of the postprocessor 36. And the postprocessor 36 is open by function V4L2_ioctl( ). Function Fimc_qbuf( ) finds a type of current task, e.g., whether 'video capture' or 'video output'. If the current task is 'video output', function Fimc$_{13}$ qbuf_output( ) is invoked (S318). The function Fimc_qbuf_output( ) determines to add a buffer to an incoming queue after checking up that the buffer is available to conduct a direct memory access (DMA) toward the postprocessor 26 (S320). Next, function Fimc_qbuf_output_dma_auto( ) updates a position of the area to be converted in color space (S322). Then, function Fimc_outdev_start_camif( ) starts RGB conversion with the postprocessor 36 (S324)

Steps S326 through S330, for mixing left and right images, are an interrupt service routine executed by an interrupt occurring after the postprocessor 36 completes the color space conversion from YUV image to RGB image.

Whenever completing the color space conversion from YUV image to RGB image for each frame, the interrupt occurs in the postprocessor 36 and function Fimc_irq( ) is invoked (S326). Under the mode of 'video output', the function Fimc_irq( ) invokes function Fimc_irq_out( ) (328) and the function Fimc_irq_out( ) invokes function Fimc_irq_out_dma( ).

The function Fimc_irq_out_dma( ) mixes left and right images from an RGB bit stream and then transfers the mixed RGN image to the second frame buffer 298 through the RGB buffer 284A (330).

In detail, the RGB bit stream is not transferred in sequence, but transferred in the manner that left and right image pixels are alternately abstracted from a 3D RGB image of side-by-side format. In other words, the function Fimc_irq_out_dma( ) abstracts a first left image pixel in the unit of scan line from an RGB image and transfers the first left image pixel to a first pixel position of the RGB buffer 284A, and then abstracts a first right image pixel in the unit of scan line from the RGB image and disposes the first right image pixel at a second pixel position of the RGB buffer 284A. Next, the function Fimc_irq_out_dma( ) abstracts a second left image pixel from the RGB image and transfers the second left image pixel to a third pixel position of the RGB buffer 284A, and then abstracts a second right image pixel from the RGB image and disposes the second right image pixel at a fourth pixel position of the RGB buffer 284A. By conducting this sequence over the RGB image, the RGB buffer 284A takes and stores a mixed image where left and right images are alternately arranged in the unit of vertical line.

Owing to the function Fimc_irq_out_dma( ), the mixed RGB bit stream can be transferred by DMA to the second frame buffer 298 that is exclusive for motion picture processing.

Figure 8:
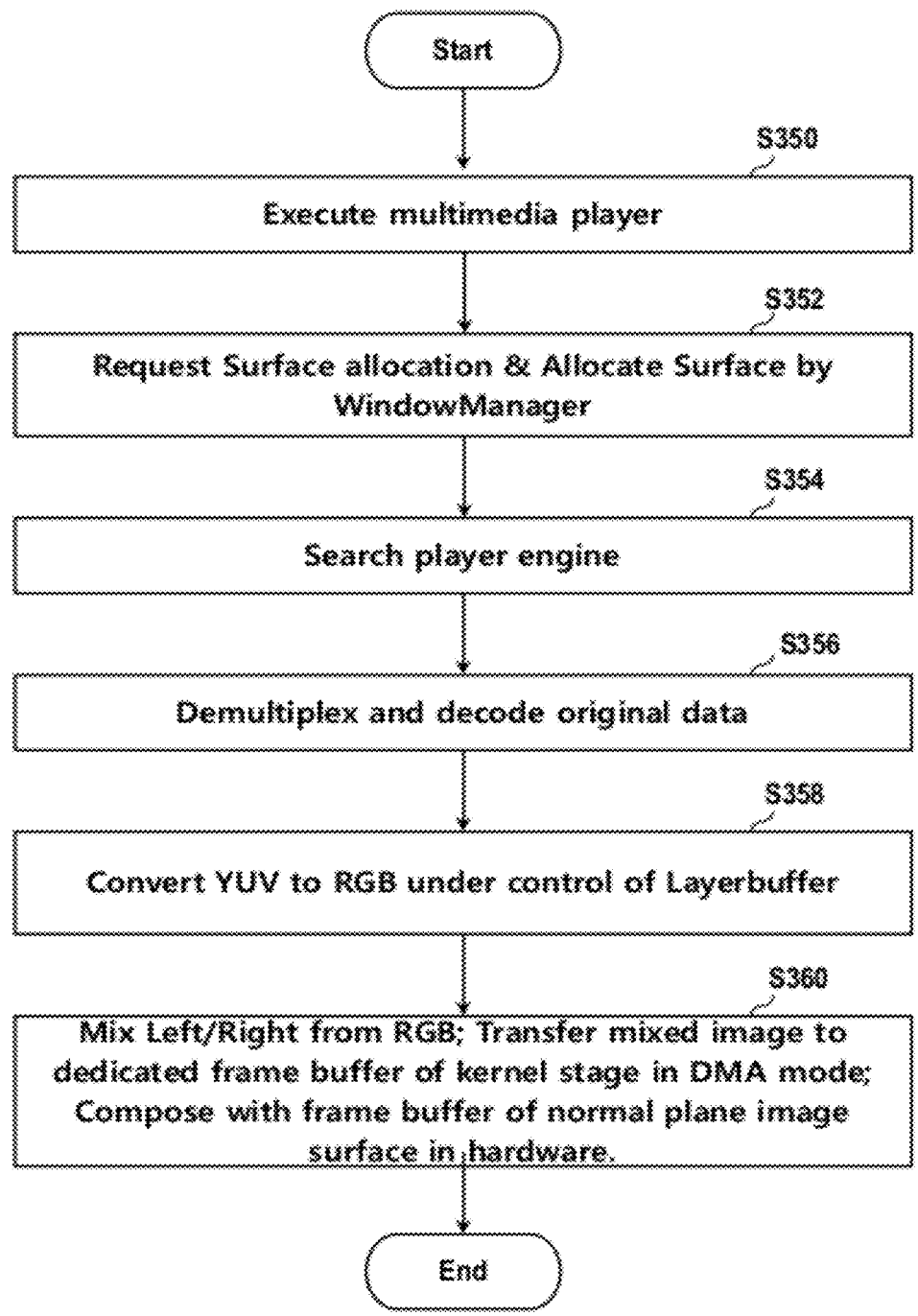
FIG. 8 is a flowchart showing an overall procedure of 3D image display by adopting the mixing process shown in FIG. 6 according to an exemplary embodiment of the present invention.

FIG. 8 is a flowchart showing an overall procedure of 3D image display by adopting the mixing process shown in FIG. 6 according to an exemplary embodiment of the present invention.

A user executes the multimedia player 100 and selects a media file (S350). During this, it is even permissible for a user to select a media file before executing the multimedia player 100.

In step S352, the VideoView class 200 of the multimedia player 100 requests surface allocation from the SurfaceView class 210. The SurfaceView class 210 for generating and managing a surface, but not creating the surface by itself, just requests the surface from the WindowManager class 220 which generally manages surfaces. The WindowManager class 220 requested by the SurfaceView class 210 requests a surface from the SurfaceFlinger class 262 by way of JNI and then the SurfaceFlinger class 262 allocates the requested surface. The allocated surface is conditioned to be transferred to the MediaPlayer 230 where that is to be used practically.

In step S354, the VideoView class 200 searches a media player engine (e.g., the PVPlayer 244 shown in FIG. 5), which functions to conduct an image playback operation, through the MediaPlayer class 202. Consequently, the PVPlayer 244 can be selected as an example. The VideoView class 200 transfers the allocated surface and the selected media file to the selected media player engine (i.e., the PVPlayer 244). Then, the PVPlayer 244 begins preparing to play the selected media file and enables the video CODEC 246, which is present in the OpenCORE framework, to be executed through the PlayerDriver 242. And the PVPlayer 244 connects the surface, which is to be used, with the video CODEC 246 by way of the AndroidSurfaceOutput class 246.

In step S356, according to an activation of the PVPlayer 244, the original data is demultiplexed and decoded. Here, the original data may be a data stream received from a streaming server, or a multimedia file stored in the memory 20, being structured in a container form compositively with pluralities of contents such as image, audio, data and so on. The PVPlayer 244 abstracts a motion picture source from the container by demultiplexing the original data. The video CODEC 246 decodes the motion picture source that is compressed, and outputs YUV video frame data. This YUV image signal output from the video CODEC 246 is transferred to the LayerBuffer class 250 by way of the PlayerDriver 242 and the AndroidSurfaceOutput class 248.

In step S358, the YUV image signal transferred to the LayerBuffer class 250 is converted into an RGB image signal by the postprocessor 36 under control of SurfaceLayerBuffer class that is a subclass of the LayerBuffer class 250. The RGB image signal converted by the postprocessor 36 is transferred to an allocated surface buffer, i.e., the RGB buffer 284A.

If the RGB image signal is configured in 2D, it is transferred to the second frame buffer 298 of the kernel stage from the RGB buffer 284A, composed in hardware with Surface1 and Surface2 corresponding to normal plane images in the LCD controller 50, and then displayed on the LCD panel 52. On the other hand, if the RGB image signal is configured in 3D, the SurfaceFlinger class 262 enables an overlay class of the postprocessor 36 to prosecute the overlay function against the image that has been converted in the RGB color space. Thus, left/right image pairs contained in the RGB image signal are alternately mixed and stored in the RGB buffer 284A and then transferred to the second frame buffer 298 in DMA mode. The mixed RGB image, after composed with Surface1 and Surface2, which are stored in the first frame buffer 296 in correspondence with a normal plane image, in the LCD controller 50, is displayed on the LCD panel 52 as a 3D image (S360).

Steps S356 through S360 are repeated until the original data is completely played back.

Figure 9:
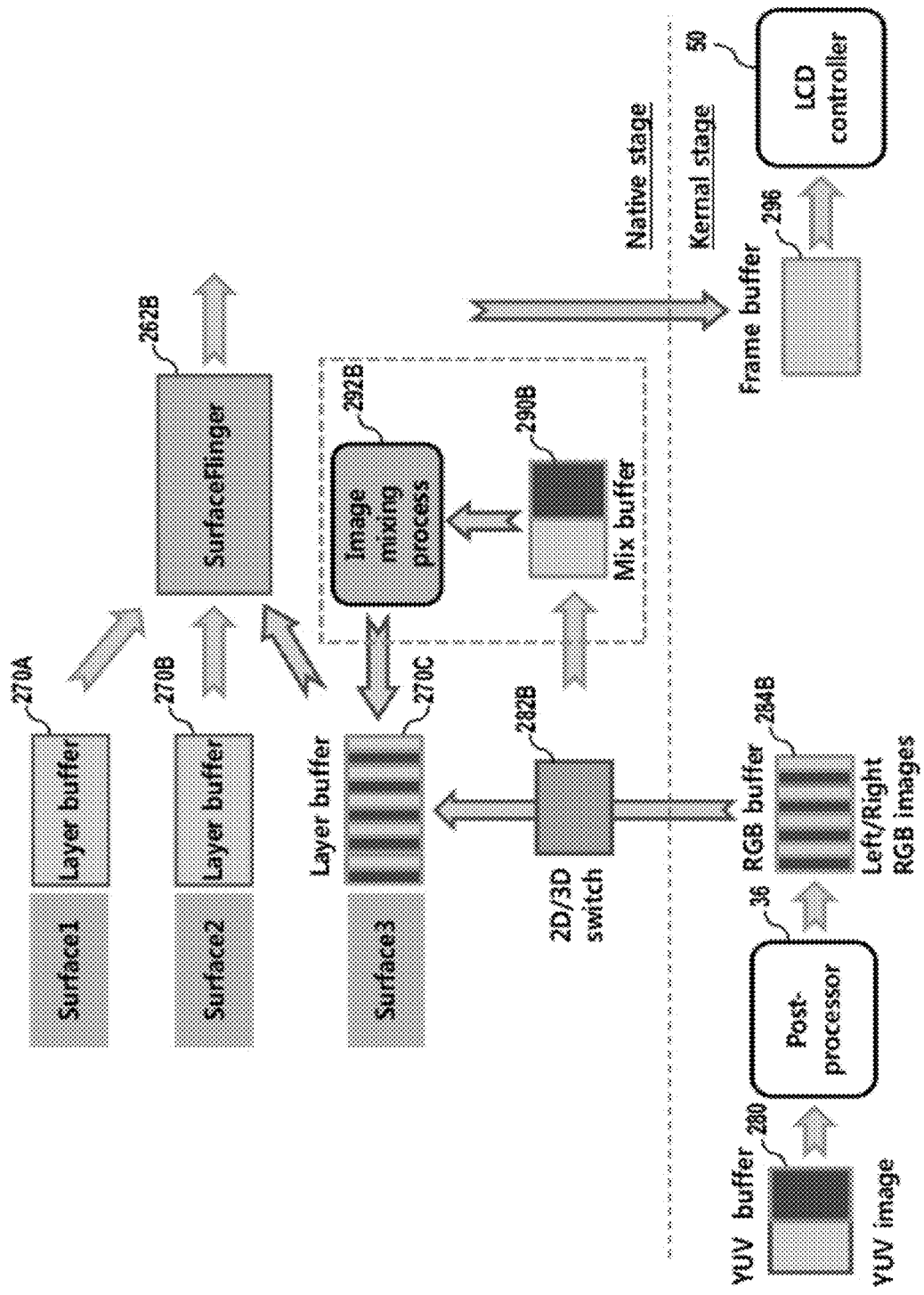
FIG. 9 illustrates an output terminal configured for color space conversion and mixing process with left and right images in the display apparatus shown in FIG. 1 according to an exemplary embodiment of the present invention.

FIG. 9 illustrates an output terminal configured for color space conversion and mixing process with left and right images in the display apparatus shown in FIG. 1 according to an exemplary embodiment of the present invention.

Referring to FIG. 9, the process of this output terminal is configured to compose a 3D image by mixing left and right images forming a stereoscopic image pair, also offering one or more composite normal plane images along with such a 3D image. Here, the 3D image and a plurality of normal plane images are composed in software by means of SurfaceFlinger class 262B.

In this exemplary embodiment, the native stage is comprised of the first through third layer buffers 270A~270C, 2D/3D switch 282B and mix buffer 290B, prosecuting image mixing process 292B.

The first and second layer buffers, 270A and 270B, are general surface buffers used by the SurfaceFlinger class 262B, storing normal plane image surfaces generated by a variety of activities which are Java applications. These plane images, having general rendering characteristics, may be information of titles and menus accompanied while playing texts, rendered 3D images or 3D image contents.

The third layer buffer 270C is provided for processing 3D motion picture display or camera preview. Motion picture data stored in the third layer buffer 270C may be supplied from the kernel stage. In the kernel stage, the YUV buffer 280 receives a YUV image signal from the LayerBuffer class 250 and the postprocessor 36 converts the buffered YUV image signal into an RGB image signal under control of the ServiceFlinger class 262B or the LayerBuffer service 250. The RGB image signal converted from the YUV image signal is stored in RGB buffer 284B. The 2D/3D switch transfers the RGB image signal directly to the third layer buffer 270C from the RGB buffer 284B if the image signal to be played back is configured in 2D, or if the image signal to be played back is configured in 3D, transfers the RGB buffer 284B to the mix buffer 290B so as to make the image mixing process 292B mix left and right images of the RGB image signals. This mixed RGB image signal is then stored in the third layer buffer 270C.

In detail for the mixing process with left and right images, the image mixing process 292B does not transfer bit streams in sequence, but copy by alternately abstracting pixels from the parts of left and right images in the 3D RGB image of side-by-side format, in sending the bit streams of image signals to the third layer buffer 270C from the mix buffer 290B. That is, the image mixing process 292B abstracts a first left image pixel in the unit of scan line and transfers the first left image pixel to a first pixel position of the third layer buffer 270C, and then abstracts a first right image pixel in the unit of scan line and disposes the first right image pixel at a second pixel position of the third layer buffer 270A. Subsequently, the image mixing process 292B abstracts a second left image pixel from the RGB image of the mix buffer 290B and transfers the second left image pixel to a third pixel position of the third layer buffer 270C, and then abstracts a second right image pixel from the RGB image and disposes the second right image pixel at a fourth pixel position of the third layer buffer 270C. By conducting this sequence over the RGB image, the third buffer 270C takes and stores a mixed image where left and right images are alternately arranged in the unit of vertical line.

The SurfaceFlinger class 262B, by gathering a motion picture surface (e.g., Surface3) with the normal plane surfaces Surface1 and Surface2 and rendering them to the frame buffer 296, functions to compose layered data store in the first through third later buffers 270A~270C.

In this output terminal shown in FIG. 9, regarding an operation flow of plane image surfaces for general Java applications, the surfaces respectively allocated to Java applications are composed in software by the SurfaceFlinger class 262B and then transferred to the frame buffer 296.

According to this exemplary embodiment, even the surface (e.g., Surface3) processed during an application for motion picture playback or camera preview is also composed in software by the SurfaceFlinger class 262B.

With respect to a procedure of processing a motion picture surface, a YUV image stored in the YUV buffer 280 is converted into an RGB image by the postprocessor 36 and then scaled to be fit for a screen size of the LCD panel 52. If the 2D/3D switch 282B is set on 2D mode, a normal 2D image is directly stored in the third layer buffer 270C, transferred to the SurfaceFlinger class 262B, composed with other surfaces, and then transferred to the frame buffer 296. If the 2D/3D switch 282B is set on 3D mode, an RGB image stored in the RGB buffer 284B is copied to the mix buffer 290B of the native stage. Left and right images of the RGB image stored in the mix buffer 290B are mixed by the image mixing process 292B and then transferred to the third layer buffer 270C. The mixed RGB image is transferred to the SurfaceFlinger class 262B, composed with other surfaces, transferred to the frame buffer 296, and then displayed on the LCD panel 52 in 3D mode along with its title and/or menu.

After that, a 3D RGB bit stream stored in the third layer buffer 270C is transferred to the SurfaceFlinger class 262B and composed with other surfaces. The composed image is transferred to the frame buffer 296 and displayed on the LCD panel 52 by way of the LCD controller 50. Thus, a use facing the parallax barrier 54 is able to identify a stereoscopic 3D image.

Although it would be something longer than the former exemplary embodiment shown in FIG. 6 in an overall composition time, this exemplary embodiment shown in FIG. 9 can be suitable for terminal apparatuses comprising small LCD panels or processing animation images, which especially have lower number of polygons by rendering, rather than real-time images since the motion picture surface is copied into middleware, i.e., the native stage, and composed with other surfaces in software by the SurfaceFlinger class 262B.

Figure 10:
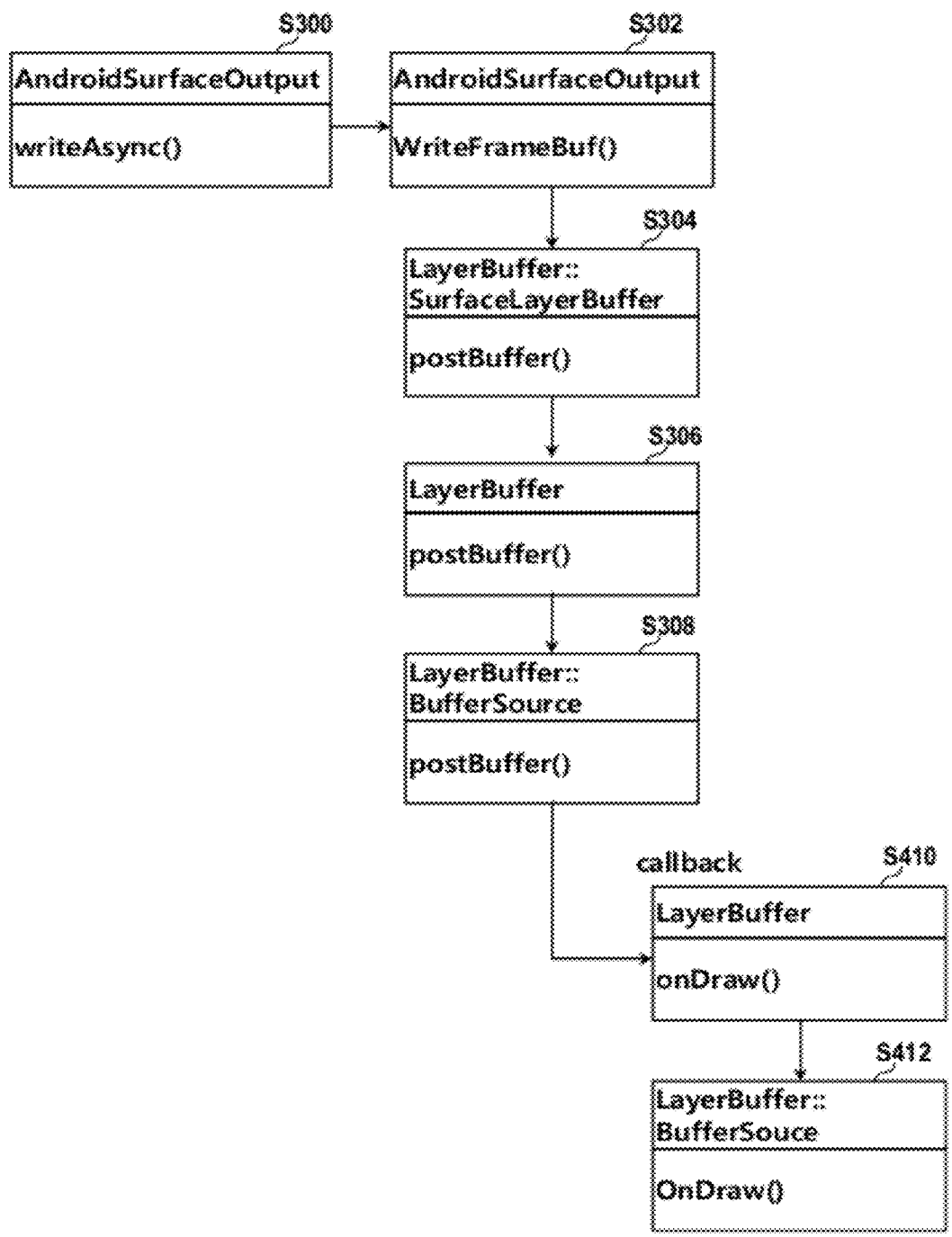
FIG. 10 is a flowchart showing an execution sequence of functions conducting the 3D image processing in the configuration shown in FIG. 9 according to an exemplary embodiment of the present invention.

FIG. 10 shows an execution sequence of functions conducting the 3D image processing in the configuration shown in FIG. 9 according to an exemplary embodiment of the present invention.

If a YUV image signal decoded from the video CODEC 246 appears in response to a timer's synchronization, the member function writeAsync( ) is executed every predetermined time in the AndroidSurfaceOutput class 250 (S300). The member function writeAsync( ) invokes the function WriteFrameBuffer( ) to copy an image signal into a buffer of the postprocessor for the purpose of conversion from a decoded YUV signal to an RGB signal (S302). The function WriteFrameBuffer( ) transfers a decoded media bit stream to SurfaceLayerBuffer class that is a subclass of the LayerBuffer class 250.

The decoded YUV bit stream is transferred to the LayerBuffer class 250 by function postBuffer( ) of the SurfaceLayerBuffer class (S304) and then transferred to the BufferSource class, which is another class of the LayerBuffer class 250, by the function postBuffer( ) (S306).

The function postBuffer( ) of the BufferSource class enables the postprocessor 36 to convert a YUV image signal into an RGB image signal while the YUV bit stream is storing in the YUV buffer 280 (S308).

After the conversion from the YUV image signal into the RGB image signal, callback function onDraw( ) of the LayerBuffer class 250 is invoked (S410). The function onDraw( ) alternately abstracts pixels from parts of left and right images of a side-by-side 3D RGB image, and inserts and disposes the abstracted pixels on a new surface. For instance, the function onDraw( ) abstracts a first left image pixel in the unit of scan line from an RGB image and disposes the first left image pixel to a first pixel position of a new surface, and then abstracts a first right image pixel in the unit of scan line from the RGB image and disposes the first right image pixel at a second pixel position of the new surface. Next, the function onDraw( ) abstracts a second left image pixel from the RGB image and disposes the second left image pixel to a third pixel position of the new surface, and then abstracts a second right image pixel from the RGB image and disposes the second right image pixel at a fourth pixel position of the new surface. By conducting this sequence over the RGB image, the new surface on the screen is formed such that the left and right images are alternately arranged in the unit of vertical line.

After mixing the left and right RGB images, the function onDraw( ) of the BufferSource service transfers an end signal to the SurfaceFlinger class 262B, enabling the SurfaceFlinger class 262B to output the mixed RGB image data to the frame buffer 296 along with other surfaces Surface1 and Surface2 (S412).

Figure 11:
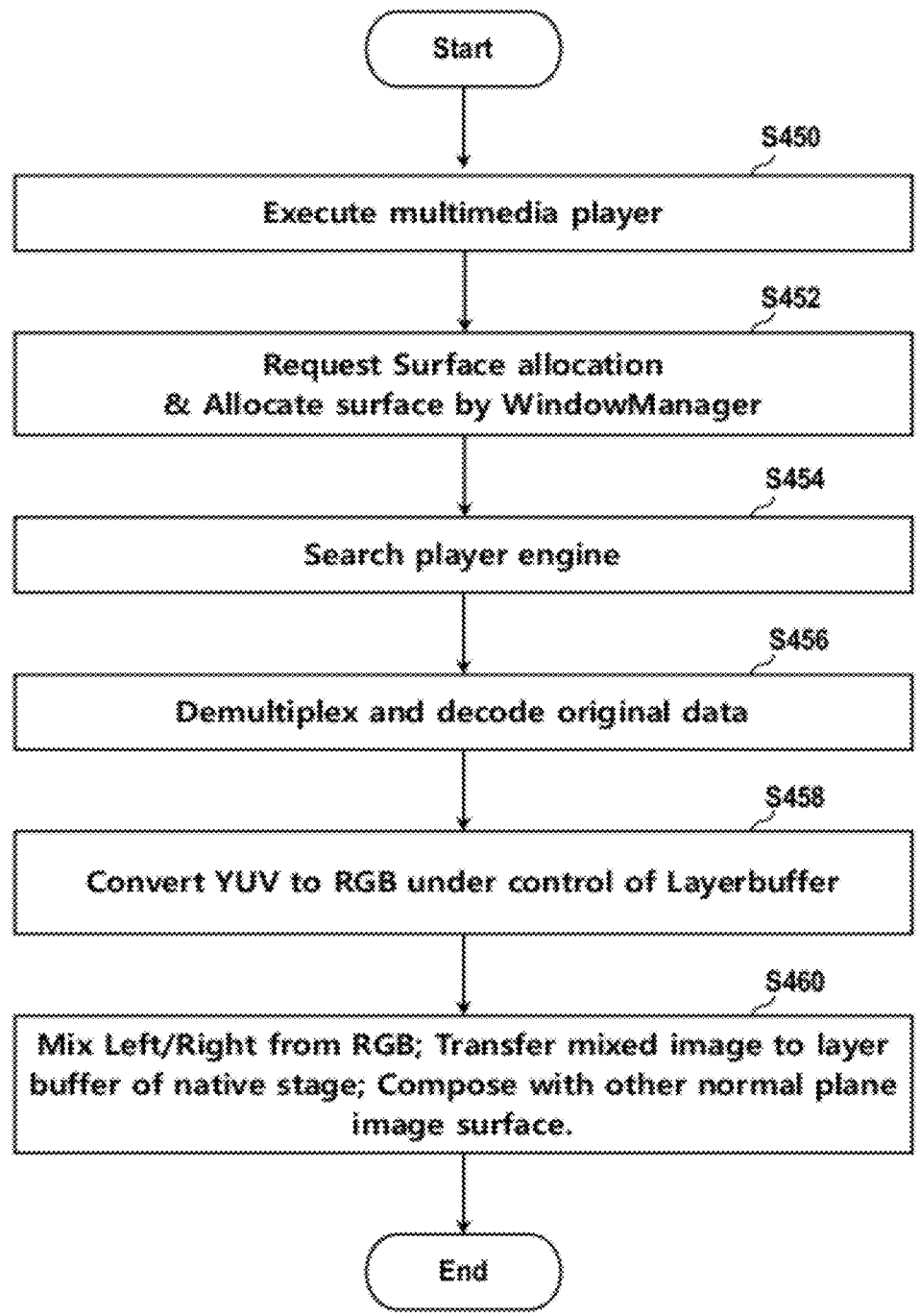
FIG. 11 is a flowchart showing an overall procedure of 3D image display by adopting the mixing process shown in FIG. 9 according to an exemplary embodiment of the present invention.

FIG. 11 shows an overall procedure of 3D image display by adopting the mixing process shown in FIG. 9 according to an exemplary embodiment of the present invention.

A user executes the multimedia player 100 and selects a media file (S450). During this, it is even permissible for a user to select a media file before executing the multimedia player 100.

In step S452, the VideoView class 200 of the multimedia player 100 requests surface allocation from the SurfaceView class 210. The SurfaceView class 210 for generating and managing a surface, but not creating the surface by itself, just requests the surface from the WindowManager class 220 which generally manages surfaces. The WindowManager class 220 requested by the SurfaceView class 210 requests a surface from the SurfaceFlinger class 262 by way of JNI and then the SurfaceFlinger class 262 allocates the requested surface. The allocated surface is conditioned to be transferred to the MediaPlayer 230 where that is to be used practically.

In step S454, the VideoView class 200 searches a media player engine (e.g., the PVPlayer 244 shown in FIG. 5), which functions to conduct an image playback operation, through the MediaPlayer class 202. Consequently, the PVPlayer 244 can be selected as an example. The VideoView class 200 transfers the allocated surface and the selected media file to the selected media player engine (i.e., the PVPlayer 244). Then, the PVPlayer 244 begins preparing to play the selected media file and enables the video CODEC 246, which is present in the OpenCORE framework, to be executed through the PlayerDriver 242. And the PVPlayer 244 connects the surface, which is to be used, with the video CODEC 246 by way of the AndroidSurfaceOutput class 246.

In step S456, according to an activation of the PVPlayer 244, the original data is demultiplexed and decoded. Here, the original data may be a data stream received from a streaming server, or a multimedia file stored in the memory 20, being structured in a container form compositively with pluralities of contents such as image, audio, data and so on. The PVPlayer 244 abstracts a motion picture source from the container by demultiplexing the original data. The video CODEC 246 decodes the motion picture source that is compressed, and outputs YUV video frame data. This YUV image signal output from the video CODEC 246 is transferred to the LayerBuffer class 250 by way of the PlayerDriver 242 and the AndroidSurfaceOutput class 248.

In step S458, the YUV image signal transferred to the LayerBuffer class 250 is converted into an RGB image signal by the postprocessor 36 under control of SurfaceLayerBuffer class that is a subclass of the LayerBuffer class 250. The RGB image signal converted by the postprocessor 36 is transferred to an allocated surface buffer, i.e., the RGB buffer 284A.

If the RGB image signal is configured in 2D, it is transferred to the third layer buffer 270C under control of the SurfaceFlinger class 262B, and composed in software with the normal plane image surfaces Surface1 and Surface2 by the SurfaceFlinger class 262B. This composited RGB image signal is transferred to the frame buffer 296 and then displayed as an image on the LCD panel 52. On the other hand, if the RGB image signal is configured in 3D, the RGB image signal stored in the RGB buffer 284B is copied to the mix buffer 290B and mixed with its left and right images through the image mixing process 292B. The mixed 3D RGB image is transferred to the third layer buffer 270C and then composed with the normal plane image surfaces Surface1 and Surface2 in software by the SurfaceFlinger class 262B (S460). The composed image signal is displayed on the LCD panel 52 by way of the frame buffer 296, showing a stereoscopic effect by virtue of the parallax barrier 54.

Steps S456 through S460 are repeated until the original data is completely played back.

The multimedia player 100 of the 3D display apparatus according to the exemplary embodiments may be present by an executable icon on a user interface displayed on the LCD panel 52. If the icon is selected, its corresponding program is executed with displaying a file index and a selected media file begins to be played. In the meantime, when a user selects a media file or a page containing a media file to be played while he is in connection with a website, it is permissible to provide the selected media file in the form of streaming mode.

In an exemplary embodiment, as illustrated in FIG. 12, an operation menu 500 may be displayed on the screen while an image is being played back. The operation menu 500 selectable by a user may be comprised of selection buttons such as 'Start/Pause' 502, 'Restart' 504, 'Back' 506, '2D/3D' 508, 'Disparity+' (to increase disparity) 510 and 'Disparity−' (to decrease disparity) 512. Here, the 'Back' button 508 is used for instructing to move to the prior screen before playing. The '2D/3D' button 508 is provided for selecting to display an image in 2D or 3D mode. The buttons of 'Disparity+' and 'Disparity−', 510 and 512, are provided for adjusting a disparity between left and right images. If a user touches the 'Disparity+' button 510, an offset value, which is to be applied when mixing left and right images, increases. For example, responding to a user's selection on the 'Disparity+' button, the mixing process is conducted after shifting the right image to the right by one pixel to the left image. If a user touches the 'Disparity−' button 512, an offset value to be applied to the left/right mixing process decreases. For example, responding to a user's selection on the 'Disparity−' button 512, the mixing process is conducted after shifting the right image to the left by one pixel to the left image. This adjusting function enhances and satisfaction to a user, as well as lessening dizziness on watching, by conditioning an optimum disparity in accordance with a screen size of the LCD panel 52 or the user's habit of looking and listening, particularly, a distance between the LCD panel 52 and the user's eyes.

Although hereinbefore described about the exemplary embodiments, the present invention may be reduced in various genres or more details without materially departing from the novel teachings and advantages thereof.

For instance, while these exemplary embodiments are shown with an original file or streaming data which is encoded in the standard of H.264, it may be permissible to decode an original file or streaming data which is encoded in another standard.

While these exemplary embodiments are described such that an input image is formatted in the side-by-side mode, it may be possible to process another type of input image, which is even formatted in the top-down or tile mode, or others, in a similar way.

Furthermore, while these exemplary embodiments are practiced such that the postprocessor is organized by means of software, it may be available with a postprocessor that is made up of hardware configuration.

In the meantime, the OpenCORE is employed as an android framework in the exemplary embodiments, but another type, e.g., the StageFright, may be used for the android framework in consideration of that the OpenCORE is regarded as complicated and difficult in modification.

Relative to the exemplary embodiments shown in FIGS. 9 through 11, there is described that the color space conversion proceeds at the kernel stage while mixing the left and right images proceeds at middleware, whereas it is also permissible to conduct both the color space conversion and the left/right image mixing at the kernel stage.

In the meantime, although not stated above, the frame buffers 296 and 298 may be prepared within the microprocessor 30 or the LCD controller 50. In case that the frame buffers 296 and 298 are settled in the LCD controller 50, 'display controller' noted in the claims is defined to conduct functions of actuating light emission for the LCD panel 52, and controlling image bit streams of the frame buffers 296 and 298 to be transferred to the LCD panel 52 directly or by overlaying.

By providing recording media with application programs and library program units of written states, they are operable in terminal apparatuses equipped with parallax barriers, or portable terminal apparatuses. Here, the terminal apparatuses are not restrictive to the portables, including fixable or semifixable apparatuses such as TVs, desktop PCs, laptop computers, and so on.

The foregoing is illustrative of exemplary embodiments and is not to be construed as limiting thereof. Although a few exemplary embodiments have been described, those skilled in the art will readily appreciate that many modifications are possible in exemplary embodiments without materially departing from the novel teachings and advantages. Accordingly, all such modifications are intended to be included within the scope of this invention as defined in the claims.

While the invention has been shown and described with reference to certain exemplary embodiments thereof, it will be understood by those skilled in the art that various changes in form and details may be made therein without departing from the spirit and scope of the invention as defined by the appended claims and their equivalents.

What is claimed is:

1. A method of processing a 3D image signal in a portable terminal apparatus equipped with hardware means having a display panel, a kernel layer directly controlling the hardware means, an application/middleware layer controlling the kernel layer to display a motion picture through the hardware means, a 3D image being displayed on the display panel along with a plane image, the method comprising:
    generating one or more plane image surfaces from the application/middleware layer and storing the one or more plane image surfaces in a first frame buffer;
    decoding an encoded image signal under the application/middleware layer and restoring a YUV image signal to represent a stereoscopic image pair;
    converting the YUV image signal into an RGB image signal at the kernel layer;
    determining whether the RGB image signal is a 2D image signal or a 3D image signal at the kernel layer;
    when the RGB image signal is the 2D image signal, transferring the RGB image signal to an RGB buffer;
    when the RGB image signal is the 3D image signal, transferring the RGB image signal to a mix buffer, mixing left and right images of the RGB image signal at the kernel layer, wherein the left and right images being alternately arranged in the unit of vertical lines of pixels, and storing a mixed stereoscopic image signal in the RGB buffer;
    transferring the RGB signal in the RGB buffer to a second frame buffer dedicated to motion playback; and
    composing signals, which are stored in the first and second frame buffers, to create a composite signal in hardware by overlaying at the kernel layer and transferring the composite signal to the display panel, wherein the display panel displays a stereoscopic image along with a normal plane image.

2. The method according to claim 1, wherein the generating and storing is comprised of:
    generating a plurality of plane image surfaces at the application/middleware layer; and
    composing the plane image surfaces at the application/middleware layer and storing the composite surface in the first frame buffer.

3. A portable 3D display apparatus of abstracting a compressed image signal from an original image signal by demultiplexing and decoding the compressed image signal for display, the apparatus comprising:
    a display panel equipped with a parallax barrier at the front and configured to display a stereoscopic image;
    a display controller configured to drive the display panel;

first and second frame buffers configured to respectively store at least parts of an image to appear at the display panel through the display controller; and a microprocessor configured to control the demultiplexing and decoding and to conduct a program comprising: a kernel layer configured to directly control the display panel; and an application/middleware layer configured to control the kernel layer to display a motion picture on the display panel, wherein the microprocessor is configured to:

generate one or more plane image surfaces at the application/middleware layer and store the plane image surfaces in the first frame buffer;

decode an encoded image signal under control of the application/middleware layer and restore a YUV image signal to represent a stereoscopic image pair;

convert the YUV image signal into an RGB image signal at the kernel layer;

determine whether the RGB image signal is a 2D image signal or a 3D image signal at the kernel layer;

when the RGB image signal is the 2D image signal, transfer the RGB image signal to an RGB buffer;

when the RGB image signal is the 3D image signal, transfer the RGB image signal to a mix buffer, mix left and right images of the RGB image signal at the kernel layer, wherein the left and right images being alternately arranged in the unit of vertical lines of pixels, and store a mixed stereoscopic image signal in the RGB buffer;

transfer the RGB signal in the RGB buffer to the second frame buffer, wherein the second frame buffer is dedicated to motion playback; and compose signals of the first and second frame buffers to create a composite signal in hardware by overlaying at the kernel layer and transfer the composite signal to the display panel, wherein the display panel displays a stereoscopic image along with a normal plane image.

4. The apparatus according to claim 3, wherein the microprocessor is configured to generate and compose the plural plane image surfaces at the application/middleware layer, and store the composite plane image surface in the first frame buffer.

5. A non-transitory computer-readable recording medium comprising a display apparatus, wherein the display apparatus comprises:

a display panel configured to display a stereoscopic image;

a display controller configured to drive the display panel;

first and second frame buffers configured to respectively store at least parts of an image to appear at the display panel through the display controller; and a microprocessor configured to operate under a layer comprising: a kernel layer configured to directly control the display panel; and an application/middleware layer configured to control the kernel layer to display a motion picture on the display panel, wherein the microprocessor is configured to:

generate one or more plane image surfaces at the application/middleware layer and store the plane image surfaces in the first frame buffer;

decode an encoded image signal under control of the application/middleware layer and restore a YUV image signal to represent a stereoscopic image pair;

convert the YUV image signal into an RGB image signal at the kernel layer;

determine whether the RGB image signal is a 2D image signal or a 3D image signal at the kernel layer;

when the RGB image signal is the 2D image signal, transfer the RGB image signal to an RGB buffer;

when the RGB image signal is the 3D image signal, transfer the RGB image signal to a mix buffer, mix left and right images of the RGB image signal at the kernel layer, wherein the left and right images being alternately arranged in the unit of vertical lines of pixels, and store a mixed stereoscopic image signal in the RGB buffer;

transfer the RGB signal in the RGB buffer to the second frame buffer, wherein the second frame buffer is dedicated to motion playback; and compose signals of the first and second frame buffers to create a composite signal in hardware by overlaying at the kernel layer and transfer the composite signal to the display panel, wherein the display panel displays a stereoscopic image along with a normal plane image.

6. The non-transitory computer-readable recording medium according to claim 5, wherein the microprocessor is configured to generate and compose the plural plane image surfaces at the application/middleware layer, and store the composite plane image surface in the first frame buffer.

7. A method of processing a 3D image signal in a portable terminal apparatus equipped with hardware means having a display panel, a kernel layer directly controlling the hardware means, an application/middleware layer controlling the kernel layer to display a motion picture through the hardware means, a 3D image being displayed on the display panel along with a plane image, the method comprising:

generating and storing one or more plane image surfaces in a plane image layer buffer;

decoding an encoded image signal under the application/middleware layer and restoring a YUV image signal to represent a stereoscopic image pair;

converting the YUV image signal into an RGB image signal at the kernel layer;

determining whether the RGB image signal is a 2D image signal or a 3D image signal at the kernel layer;

when the RGB image signal is the 2D image signal, transferring the RGB image signal to an RGB buffer;

when the RGB image signal is the 3D image signal, transferring the RGB image signal to a mix buffer, mixing left and right images of the RGB image signal at the application/middleware layer, wherein the left and right images being alternately arranged in the unit of vertical lines of pixels, and storing a mixed stereoscopic image signal in the RGB buffer;

transferring the RGB signal in the RGB buffer to a stereoscopic image layer buffer dedicated to motion playback; and composing signals, which are stored in the plane and stereoscopic image layer buffers, to create a composite signal at the application/middleware layer and transferring the composite signal to the display panel, wherein the display panel displays a stereoscopic image along with a normal plane image.

8. The method according to claim 7, wherein the generating and storing is comprised of generating the plane image surfaces and storing the plane image surfaces respectively in a plurality of plane image layer buffers, wherein the composing and transferring is comprised of composing the signals stored in the plane and stereoscopic image layer buffers.

9. A portable 3D display apparatus of abstracting a compressed image signal from an original image signal by demultiplexing and decoding the compressed image signal for display, the apparatus comprising:

a display panel equipped with a parallax barrier at the front and configured to display a stereoscopic image;

a display controller configured to drive the display panel;

a frame buffer configured to store an image which is to be displayed on the display panel; and a microprocessor configured to control the demultiplexing and decoding and to conduct a program comprising: a kernel layer configured to directly control the display panel; and an application/middleware layer configured to control the kernel layer to display a motion picture on the display panel, wherein the microprocessor is configured to:

generate and store one or more plane image surfaces in a plane image layer buffer;

decode an encoded image signal under the application/middleware layer and restoring a YUV image signal to represent a stereoscopic image pair;

convert the YUV image signal into an RGB image signal at the kernel layer;

determine whether the RGB image signal is a 2D image signal or a 3D image signal at the kernel layer;

when the RGB image signal is the 2D image signal, transfer the RGB image signal to an RGB buffer;

when the RGB image signal is the 3D image signal, transfer the RGB image signal to a mix buffer, mix left and right images of the RGB image signal at the application/middleware layer, wherein the left and right images being alternately arranged in the unit of vertical lines of pixels, and store a mixed stereoscopic image signal in the RGB buffer;

transfer the RGB signal in the RGB buffer to a stereoscopic image layer buffer dedicated to motion playback; and compose signals, which are stored in the plane and stereoscopic image layer buffers, to create a composite signal at the application/middleware layer and transfer the composite signal to the display panel through the frame buffer, wherein the display panel displays a stereoscopic image along with a normal plane image.

10. The display apparatus according to claim 9, wherein the generating and storing is comprised of generating the plane image surfaces and storing the plane image surfaces respectively in a plurality of plane image layer buffers, wherein the composing and transferring is comprised of composing the signals stored in the plane and stereoscopic image layer buffers.

11. A non-transitory computer-readable recording medium comprising a display apparatus, wherein the display apparatus comprises:

a display panel configured to display a stereoscopic image;

a display controller configured to drive the display panel;

a frame buffer configured to store at least a part of an image to appear at the display panel through the display controller; and a microprocessor configured to operate under a layer comprising: a kernel layer configured to directly control the display panel; and an application/middleware layer configured to control the kernel layer to display a motion picture on the display panel, wherein the microprocessor is configured to:

generate and store one or more plane image surfaces in a plane image layer buffer;

decode an encoded image signal under the application/middleware layer and restoring a YUV image signal to represent a stereoscopic image pair;

convert the YUV image signal into an RGB image signal at the kernel layer;

determine whether the RGB image signal is a 2D image signal or a 3D image signal at the kernel layer;

when the RGB image signal is the 2D image signal, transfer the RGB image signal to an RGB buffer;

when the RGB image signal is the 3D image signal, transfer the RGB image signal to a mix buffer, mix left and right images of the RGB image signal at the application/middleware layer, wherein the left and right images being alternately arranged in the unit of vertical lines of pixels, and store a mixed stereoscopic image signal in the RGB buffer;

transfer the RGB signal in the RGB buffer to a stereoscopic image layer buffer dedicated to motion playback; and compose signals, which are stored in the plane and stereoscopic image layer buffers, to create a composite signal at the application/middleware layer and transfer the composite signal to the display panel through the frame buffer, wherein the display panel displays a stereoscopic image along with a normal plane image.

12. The non-transitory computer-readable recording medium according to claim 11, wherein the generating and storing is comprised of generating the plane image surfaces and storing the plane image surfaces respectively in a plurality of plane image layer buffers, wherein the composing and transferring is comprised of composing the signals stored in the plane and stereoscopic image layer buffers.

\* \* \* \* \*